(12) United States Patent
Townsend et al.

(10) Patent No.: US 7,511,443 B2
(45) Date of Patent: Mar. 31, 2009

(54) ULTRA-COMPACT, HIGH-PERFORMANCE MOTOR CONTROLLER AND METHOD OF USING SAME

(75) Inventors: William T. Townsend, Weston, MA (US); Adam Crowell, Beverly, MA (US); Gill Pratt, Lexington, MA (US); Traveler Hauptman, Watertown, MA (US)

(73) Assignee: Barrett Technology, Inc., Cambridge, MA (US)

( * ) Notice: Subject to any disclaimer, the term of this patent is extended or adjusted under 35 U.S.C. 154(b) by 52 days.

(21) Appl. No.: 11/241,516

(22) Filed: Sep. 30, 2005

(65) Prior Publication Data

US 2006/0071622 A1  Apr. 6, 2006

Related U.S. Application Data

(63) Continuation-in-part of application No. 10/672,888, filed on Sep. 26, 2003.

(60) Provisional application No. 60/699,564, filed on Jul. 15, 2005, provisional application No. 60/615,490, filed on Sep. 30, 2004, provisional application No. 60/414,044, filed on Sep. 26, 2002.

(51) Int. Cl.
*H01R 13/648* (2006.01)
(52) U.S. Cl. .............. 318/568.2; 439/108; 439/92; 439/65; 700/250; 165/185
(58) Field of Classification Search ............. 318/439, 318/568.2; 439/55, 65, 63, 92, 108; 700/250; 165/185
See application file for complete search history.

(56) References Cited

U.S. PATENT DOCUMENTS

| 2,567,066 A | 9/1951 | Goldman |
| 3,789,233 A | 1/1974 | Winter |
| 4,177,499 A * | 12/1979 | Volkmann .................. 361/710 |
| 4,367,891 A | 1/1983 | Wauer et al. |
| 4,779,031 A | 10/1988 | Arends et al. |
| 4,821,594 A | 4/1989 | Rosheim et al. |

(Continued)

OTHER PUBLICATIONS

Michael Puttre, "Space-age Robots Come Down To Earth," *Mechanical Engineering*, pp. 88-89 (Jan. 1995).

(Continued)

*Primary Examiner*—Rita Leykin
(74) *Attorney, Agent, or Firm*—Edwards Angell Palmer & Dodge LLP; Peter J. Manus

(57) ABSTRACT

Featured is a controller for a motor that is ultra-compact, with a power density of at least about 20 watts per cubic cm (W/cm$^3$). The controller utilizes a common ground for power circuitry, which energizes the windings of the motor, and the signal circuitry, which controls this energization responsive to signals from one or more sensors. Also, the ground is held at a stable potential without galvanic isolation. The circuits, their components and connectors are sized and located to minimize their inductance and heat is dissipated by conduction to the controller's exterior such as by a thermally conductive and electrically insulating material (e.g., potable epoxy). The controller uses a single current sensor for plural windings and preferably a single heat sensor within the controller. The body of the controller can also function as the sole plug connector.

32 Claims, 18 Drawing Sheets

U.S. PATENT DOCUMENTS

| | | | |
|---|---|---|---|
| 4,903,536 | A | 2/1990 | Salisbury, Jr. et al. |
| 4,935,661 | A | 6/1990 | Heinecke et al. |
| 4,937,759 | A | 6/1990 | Vold |
| 4,957,320 | A | 9/1990 | Ulrich |
| 4,975,856 | A | 12/1990 | Vold et al. |
| 5,046,375 | A | 9/1991 | Salisbury, Jr. et al. |
| 5,155,423 | A | 10/1992 | Karlen et al. |
| 5,159,218 | A | 10/1992 | Murry et al. |
| 5,207,114 | A | 5/1993 | Salisbury, Jr. et al. |
| 5,280,983 | A | 1/1994 | Maydan et al. |
| 5,281,026 | A * | 1/1994 | Bartilson et al. ............ 374/143 |
| 5,309,349 | A | 5/1994 | Kwan |
| 5,325,265 | A * | 6/1994 | Turlik et al. ................ 361/702 |
| 5,327,790 | A | 7/1994 | Levin et al. |
| 5,346,351 | A | 9/1994 | Priolo et al. |
| D351,849 | S | 10/1994 | Cheung et al. |
| D352,050 | S | 11/1994 | Ulrich et al. |
| 5,383,340 | A * | 1/1995 | Larson et al. .............. 62/259.2 |
| 5,385,478 | A * | 1/1995 | Niekawa ...................... 439/67 |
| 5,388,480 | A | 2/1995 | Townsend |
| 5,501,498 | A | 3/1996 | Ulrich |
| 5,625,265 | A * | 4/1997 | Vlahu .................. 318/400.27 |
| 5,663,672 | A | 9/1997 | Nuechterlein |
| 5,678,646 | A * | 10/1997 | Fliege ...................... 180/65.1 |
| 5,912,541 | A | 6/1999 | Bigler et al. |
| 5,934,096 | A * | 8/1999 | Munson et al. .............. 62/298 |
| 5,967,580 | A | 10/1999 | Rosheim |
| 6,019,165 | A * | 2/2000 | Batchelder ................. 165/80.3 |
| 6,049,474 | A | 4/2000 | Platnic |
| 6,462,457 | B2 | 10/2002 | Shah et al. |
| 6,517,132 | B2 | 2/2003 | Matsuda et al. |
| 6,541,881 | B1 * | 4/2003 | Turner .......................... 310/36 |
| 6,583,682 | B1 | 6/2003 | Dubhashi et al. |
| 6,684,944 | B1 | 2/2004 | Byrnes et al. |
| 6,705,902 | B1 * | 3/2004 | Yi et al. ...................... 439/678 |
| 6,817,641 | B1 | 11/2004 | Singleton, Jr. |
| 6,929,487 | B1 * | 8/2005 | Raghavendra et al. ...... 439/76.1 |
| 6,942,018 | B2 * | 9/2005 | Goodson et al. ........... 165/80.4 |
| 2002/0063486 | A1 * | 5/2002 | Huth ..................... 310/156.57 |
| 2004/0137791 | A1 * | 7/2004 | Palomaki et al. ............ 439/607 |
| 2004/0181730 | A1 * | 9/2004 | Monfared et al. ........... 714/745 |
| 2005/0145366 | A1 * | 7/2005 | Erel ........................... 165/80.3 |

OTHER PUBLICATIONS

Advertisement, Barrett Hand, IEEE Robotics and Automation Magazine (Mar. 1994).

Barrett Technology, Inc., BH8-250 BarrettHand Information Sheet (2 pages).

Barrett Technology, Inc., BarrettHand BH8-200 Electrical Interface Specifications.

CPU Board and Motor Board Component Size Specification Sheets for Barrett Hand (1993).

Barrett Technology, Inc., Final Report, Contract NAS9-18642, "Design of an Integrated Arm/Wrist/Hand System for Whole-Arm Manipulation," pp. 1, 23, 24, 28 and 29, (Jun. 1, 1994).

Barrett Technology Inc., "Tiny Motor Provides High Precision," Mechanical Engineering, p. 36 (Apr. 1995).

Adept Technology, Inc., Specification Sheets for Adept FireBlox-1™ Control Module, (4 pages), and Adept FireBlox-1™ Ordering Information (1 page) (Apr. 25, 2003).

Robotics Research Corporation, "Dexterous Manipulators and Advanced Control Systems," (7 pages); Website: http://www.robotics-research.com/.

Amtec GmbH, "Power Cube: Rotary and Linear Actuators, Robotic Components, Handling Systems." Website: http://www.amtec-robotics.com/.

J.T. Boys, "Novel Current Sensor for PWM AC Drives," IEE Proceedings, vol. 135, Pt. B, No. 1, pp. 27-32 (Jan. 1988).

Intellico, Inc., Specification Sheets for Intellimotor™ Series (1990).

AllMotion, Inc., News Release, "Worlds Smallest Servo Drive from AllMotion Inc.," Website: http:www.allmotion.com/EZSV10pressrelease.htm.

AllMotion, Inc., AllMotion Stepper Drive, Stepper Controller, Servo Controller, Server Drive, and Servo Motor Controller and Driver. Website: http://www.allmotion.com.

Carts Zone, "Speed Controller Info, Alltrax DCX 400 Speed Controller," Website: http://www.cartszone.com/400.html.

Alltrax, Inc., "DCX 300 and 400 amp Separately Exited Motor Controllers," Website: http://www.alltraxdinc.com/old/DCX%20300%20&%20400.htm.

Castle Creations, Brochure "Phoenix-25™ Brushless Motor Control."

R.C. Kavanagh, J.M.D. Murphy and M.G. Egan, "Innovative Current Sensing For Brushless DC Drives," IEE PEVD Conf. Publ., pp. 354-357 (1988).

"Three Phase Current Measurements Using a Single Line Resistor on the TMS320F240," Literature No. BPRA077, Texas Instruments Europe (May 1998).

Electronic Design: Gate-Drive Optocoupler Targets Low-Power Motor Control, http://electronicdesign.com/Articles/Index.cfm?AD=1&ArticleID=3694.

EuroTech: PC/104 Dual Isolated DC Servo Motor Controller, DAQ-1250, Project Product, http://wwweurotech.fi/products/DAQ-1250.html.

Precision Motor Controls: SMD (Small Drive) Series Motor and Drives, Operator's Manual, PN 04-01905 A.

\* cited by examiner

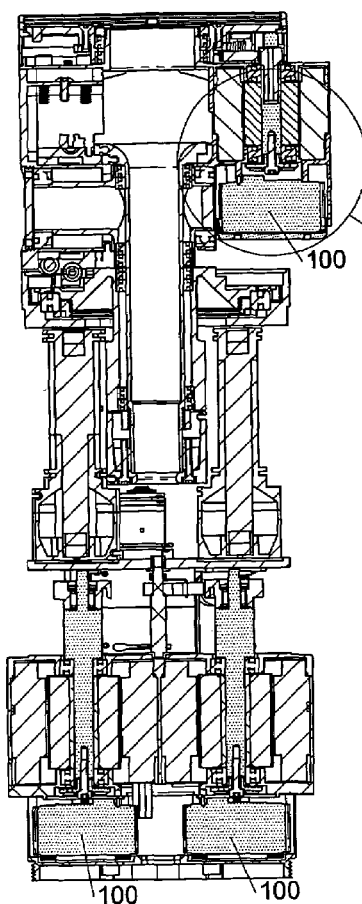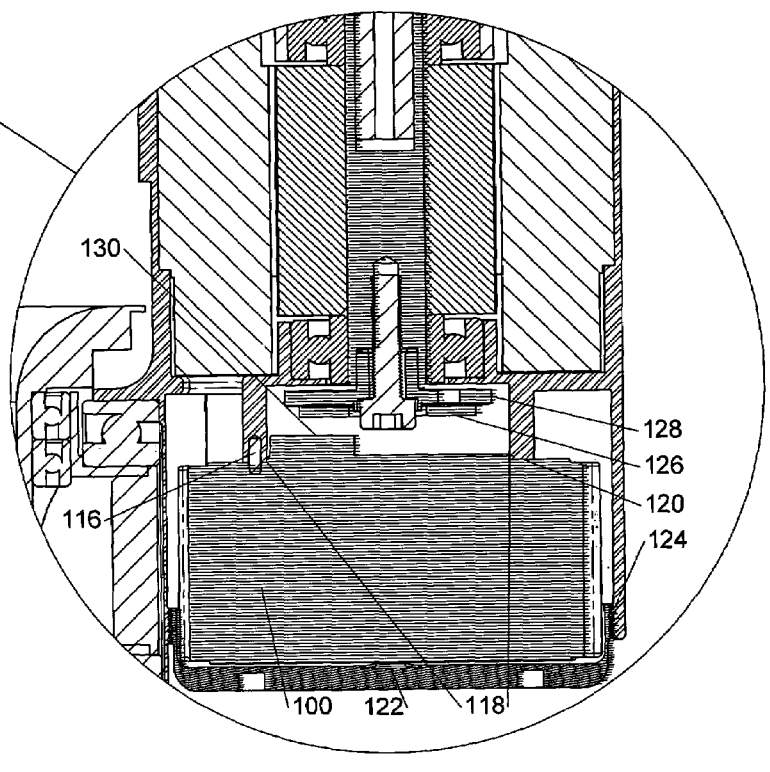
FIG. 2A  FIG. 2B

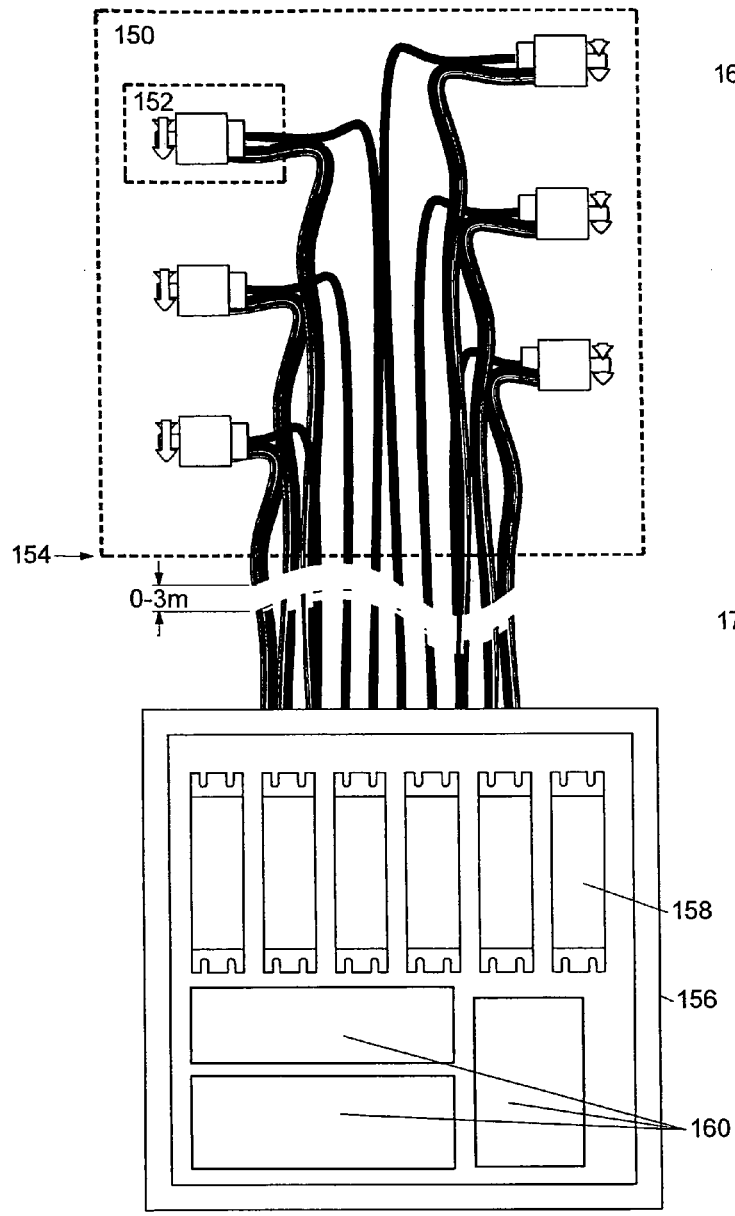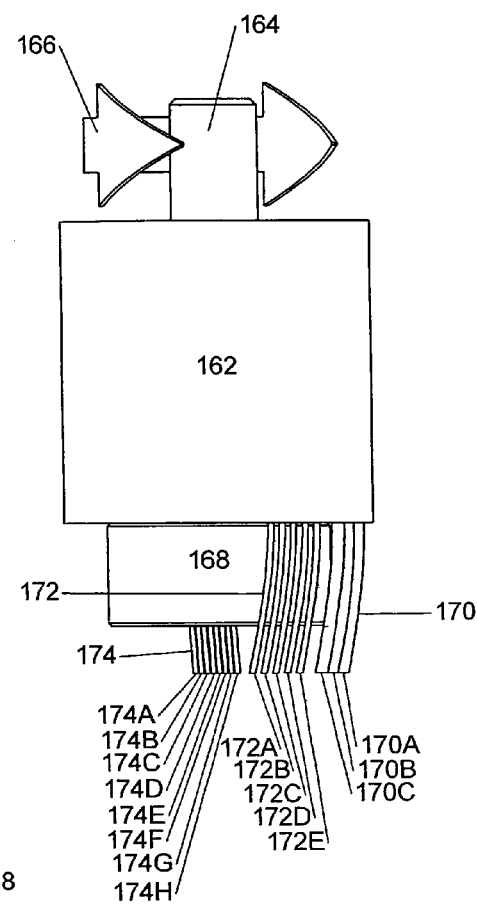
FIG. 5A
(PRIOR ART)
FIG. 5B
(PRIOR ART)

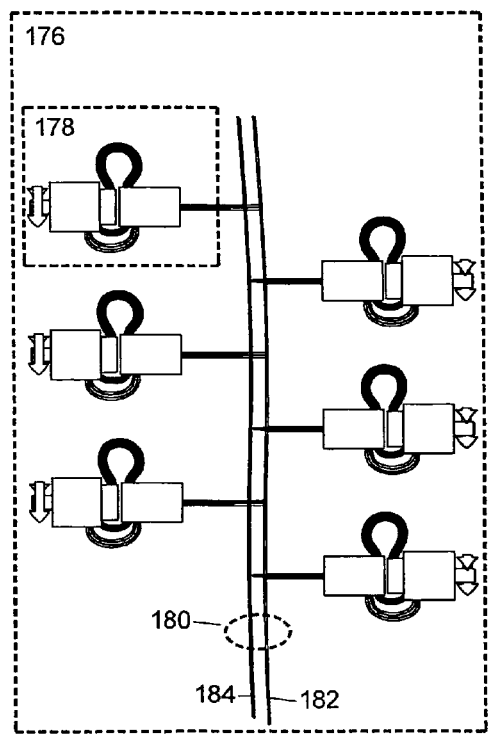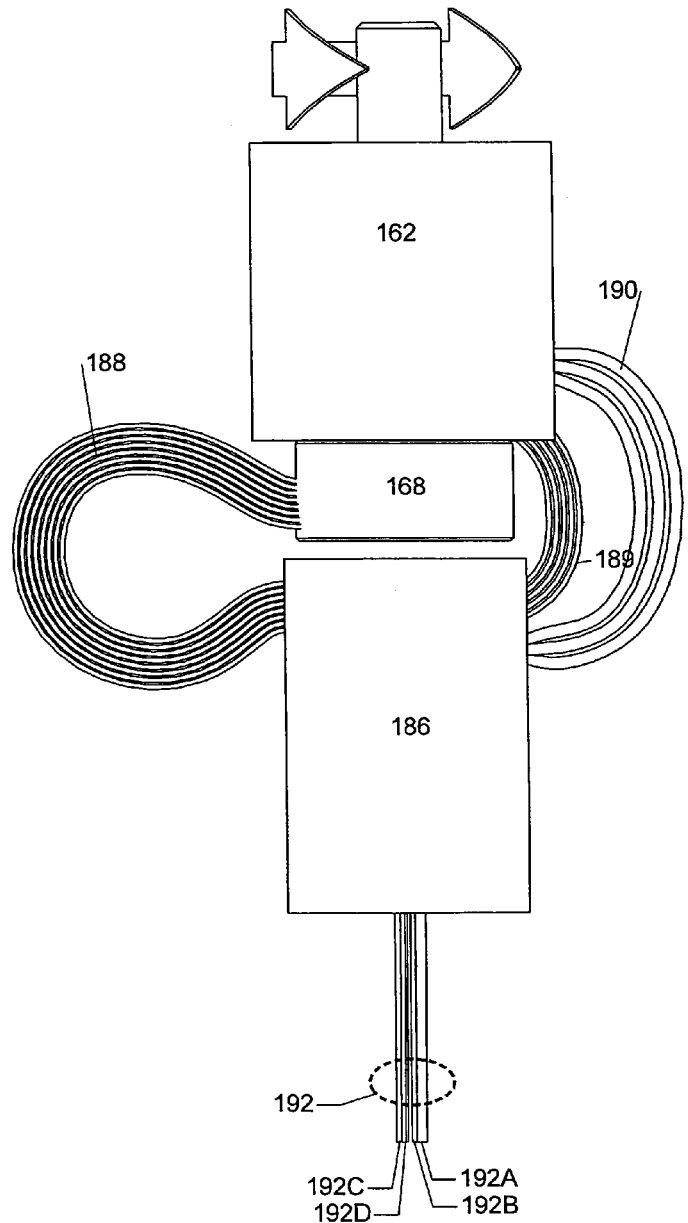
FIG. 6A
(PRIOR ART)
FIG. 6B
(PRIOR ART)

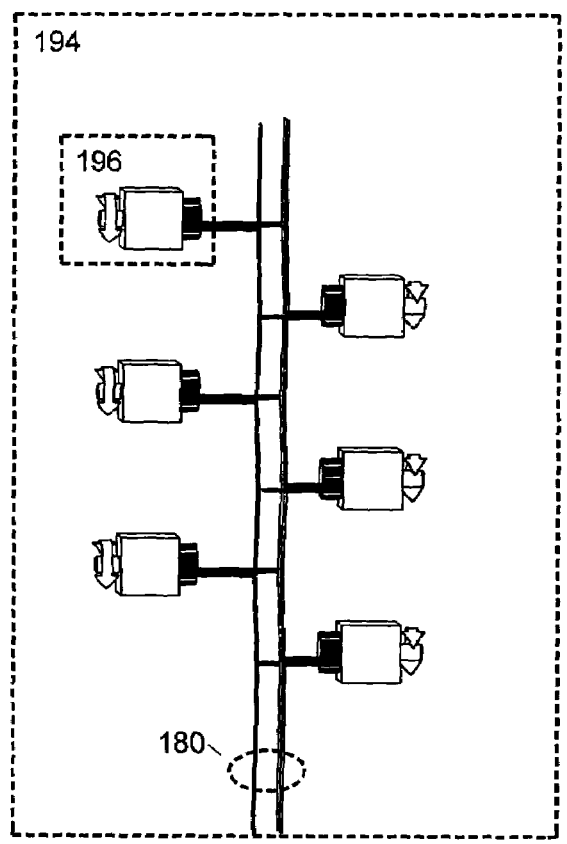
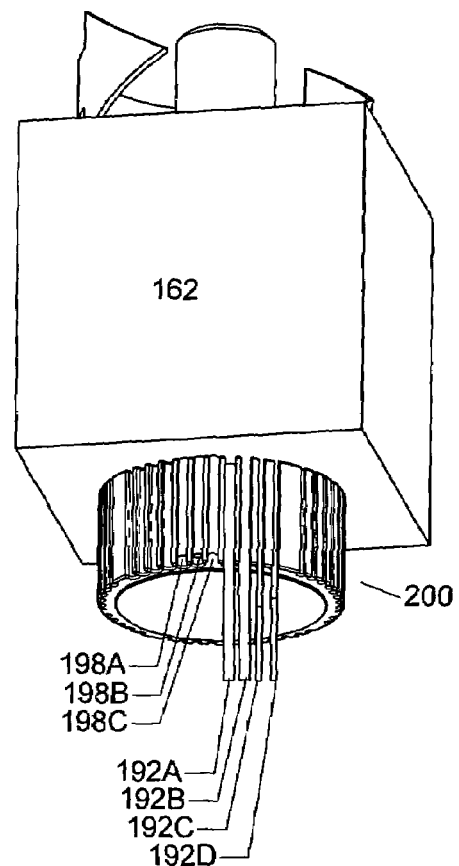
FIG. 7A  FIG. 7B

ULTRA-COMPACT, HIGH-PERFORMANCE MOTOR CONTROLLER AND METHOD OF USING SAME

CROSS-REFERENCE TO RELATED APPLICATIONS

This application is a Continuation-In-Part of U.S. patent application Ser. No. 10/672,888, filed Sep. 26, 2003, which claims priority under 35 U.S.C.§119(e) of U.S. Provisional Application No. 60/414,044, filed Sep. 26, 2002. This application also claims the benefit of U.S. Provisional Application Ser. No. 60/615,490 filed Sep. 30, 2004 and U.S. Provisional Application Ser. No. 60/699,564 filed Jul. 15, 2005, the teachings of which are incorporated herein by reference.

FIELD OF THE INVENTION

This invention relates in general to controllers for electrical motors and their use topology. More specifically, it relates to an ultra-compact, high performance controller for use on an associated motor that has at least one motor winding that carries an electrical current controlled by the controller, and a network of such motor-controllers.

BACKGROUND OF THE INVENTION

Every day modern consumers and workers are aided by dozens of electric motors, which convert electric current and voltage into torques and motions. These motors adjust the seats, windows, mirrors, and even steering in cars; bring to life the latest robotic pets; power blenders; drive refrigerator and air-conditioner compressors; wash our clothes and dishes; open our canned goods; drill, saw, and sand wood; and on and on. In factories, electric motors drive CNC milling machines, lathes, robotic arms, conveyer belts, fork-lifts, vacuum systems, hydraulic pumps, and air compressors. Even semi-autonomous robots exploring our solar system use electric motors. The trend is for increased adoption of high performance motors and especially adoption of networks of distributed motors.

The extraordinarily dense scale of integrated circuits and other exponentially improving technologies that support machine intelligence, such as embedded processors, tiny electronic sensors, and even high-density power storage, set expectations that electric actuators, especially their electronic controllers, will follow a similar rapid improvement trend. But, improvements in electric motor controllers, such as power-density (W/cm$^3$), have been painfully slow.

This is especially the case for high-performance motor drives that tend to have sophisticated circuits that require a mix of both noisy power components/circuits and noise-sensitive components and circuit signals. Those trained in the art are taught that bringing a noisy component within close proximity to sensitive component increases Electromagnetic Interference (EMI) for the sensitive component. Consequently, those skilled in the art keep the noisy component and the sensitive component spaced apart from each other to significantly minimize if not avoid this. However, those trained in the art also know that distancing the noisy and sensitive components increases the impedance across a common ground. Once the integrity of that ground is lost to impedance, noise easily corrupts sensitive analog and digital-logic signals.

Faced with this dilemma, those trained in the art apply galvanic isolation (e.g. isolation transformers, active opto-isolators, and the circuits that support them) liberally to separate noisy and sensitive components/circuits and bypass the ground-impedance issue altogether. This solution also has the advantage of allowing unrestricted airflow for ample convection cooling. This solution however, is at the cost of increased size, increased power requirement and increased complexity.

In direct opposition to the increase in size is the demand for smaller overall package size to accommodate higher numbers of motors and controllers in cramped spaces. The explosive demand for controllers with more performance in a smaller package thus, grows unabated. It is difficult, however, to decrease the size substantially without unduly restricting air flow (e.g., air flow for cooling) which can create internal hot spots that ultimately lead to controller failure.

It thus would be desirable to provide a controller for a motor that is ultra compact, which can be mounted proximal to the motor and which is relatively insensitive to EMI affects from power-level circuitry. It would be particularly desirable to provide such a controller that embodies a common unipotential ground for noisy power circuitry that energizes the windings of the motor as well as the signal circuitry that controls this energization in response to signals from one or more sensors. Such a controller also would be desirably smaller in comparison to prior art controllers that handle comparable power. It also would be desirable to provide such a controller having fewer components as compared to such prior art controllers. It also would be desirable to provide apparatuses and the like that embody such controllers as well as methods related thereto. Such controllers preferably would be simple in construction and less costly than prior art controllers.

SUMMARY OF THE INVENTION

The present invention features a controller for a motor having an output element and at least one stator winding. Such a controller includes a power circuit that controls current in the at least one phase winding of the motor, a sensor that observes current in the power circuit, a signal circuit that controls the power circuit, and an electrical ground common to the power and the signal circuits. Such a controller also includes electrical connectors among the ground and the power and signal circuits. Further, such power and signal circuits, ground, and connectors are ultra-compact to produce substantially the same potential throughout the ground during the operation of the controller.

Controllers according to the present invention are advantageous in a number of respects as compared to prior art controllers. Such controllers are compact or smaller as compared to prior art controllers, particularly when compared to prior art controllers that handle comparable power. Such controllers also will be generally lighter as compared to comparable prior art controllers, which is particularly beneficial if the motor and controller are located at the actuator end of a robot link.

Such controllers of the present invention embody fewer components as compared to prior art controllers, especially components that are generally bulky and costly (e.g., isolators, wiring for plural axes, EMI control stacks, and fans. A controller of the present invention preferably conducts heat being generated within the controller to the exterior of the controller. Such a controller can provide good heat control or heat management without the cost, bulk and power consumption associated with the fans as well as other functionalities of convection type of cooling systems. Such heat control characteristics of the controller beneficially result in a substantially isothermal temperature profile within the controller.

Such controllers can be located proximal to the motor it is controlling yet has the beneficial effect of being relatively insensitive to noise that may be generated by the power level circuitry. Such controllers also can provide a high-precision positional determination for the motor that can be preferably achieved without increasing the bulk of the controller.

Such controllers can be used or easily adapted for use in motor network topologies and further to allow for power sharing and power generation. For example, the controller of the present invention can be used to cause power to be generated by one motor/generator that can be utilized by another motor(s) of the network which in turn can lead to other beneficial effects (e.g., reduced wiring size). Such controllers are preferably constructed so as to be resistant to environmental effects such as if the controller were submerged in liquids or corrosive fluid environments.

In embodiments of the present invention such a controller further includes a thermally conductive, electrically insulating casting that at least in part encases the controller (e.g., functionalities of the controller) so as to provide a conductive thermal path to communicate heat generated within the controller to its exterior surface. In particular embodiments, the conductive path from any point within the controller to the exterior surface of the controller is less than a predetermined value such that the internal heat transfer for heat dissipation is principally conductive and sufficient to produce a substantially isothermal temperature gradient within the controller.

In more particular embodiments, certain functionalities such as the power transistors are located near the controller's exterior surface such that there is a thin layer of the casting between the functionality and the exterior surface. In more specific embodiments, the predetermined value is about 1-3 cm or less and more particularly about 2 cm or less and the thin layer is set so as to have a thickness of generally about 1-2 mm, more particularly generally about 1 mm. In further embodiments, the sensor includes a single temperature sensor located within the controller and the materials comprising the casting include but are not limited to an epoxy.

In further embodiments, a transmitted power density of about at least 20 watts per cubic centimeter characterizes such a controller and the external connectors of the controller are characterized by a very low inductance. In yet further embodiments, such connectors of the controller include a common mode choke for outside serial communications. It should be realized that the connectors provide continuous electrical connection with no isolators.

In further embodiments, the controller ground is a plane of a conductive material with a very low inductance. Also the controller further includes shielding to manage EMI.

The power circuitry of a controller of the present invention includes a PC board, plural power transistors mounted on the PC board at its periphery, and a DC to DC transformer disposed with respect to said plural power transistors, more particularly positioned in proximity to or in contact with the power transistors. In particular embodiments, the power transistors are FET's having heat-conducting backs facing outwardly and in a conductive heat-transferring relationship with said casing.

In further embodiments, the motor windings are plural windings and said sensor includes a single current sensor that measures the currents flowing in each of said windings. Also, the single current sensor can include a high-speed operational amplifier connected across a high precision resistor and the electrical connectors connect one lead of the resistor to the ground.

The sensor can include an encoder, such as an optical encoder, that detects the position of the output of the motor and is co-located on and integral with the controller. Also, the conductors that connect the encoder with the signal circuit (e.g., the digital signal processor or DSP) provide the positional detection information. In more particular embodiments, such encoder conductors have a length of less than about 10 mm. In conventional uses, high precision encoders normally limit motor RPM due to bandwidth limitations, however, the controller arrangement of the present invention such as the short leads or conductors between the encoder and the signal circuitry enable calculation of useful velocity information even at extremely low speed.

In further embodiments, two or more controllers can be operably coupled to each other so as to form a network of controllers and their associated motors. In particular embodiments, such controllers further include electrical connectors that are exterior to the controller, where the exterior electrical connectors are operably coupled to each other so as to form the network of controllers and associated motors. In more particular embodiments, the second electrical connectors interconnect the signal circuits of each of the controllers to coordinate the energization of the motor windings of the motors and to control the distribution of electrical power among the networked motors and controllers. In more specific embodiments, the motors, when acted on by an external force/torque, function as generators of electrical power that can be distributed throughout the network.

As can be seen from the foregoing, this invention presents an ultra-compact motor controller, that can include an integrated precision optical position sensor for use with a motor having a "full size, multi-amp" power rating (above the "milliamp" level, but below that of heavy industrial motors that draw hundreds of amperes). In an exemplary illustrative embodiment, the entire coin-shaped, 44-gm weight, controller package measures only 17 $cm^3$. This extreme small size form factor is smaller than most optical encoders and resolvers of similar precision, yet the motor-control performance, especially in the control of torque and minimization of torque ripple, competes with most full-size multi-amp controllers including those that are 1000 times larger. A low-profile connector system can be integrated into the overall packaging volume of 17 $cm^3$, with 44 pins available.

In exemplary embodiments, the present invention features a controller for a motor that is ultra-compact, with a power density of at least about 20 watts per cubic cm ($W/cm^3$). Such a controller embodies a common ground for noisy power circuitry that energizes the windings of the motor as well as the signal circuitry that controls this energization in response to signals from one or more sensors. The circuits, their components and connectors are sized and located to minimize their inductance. Also, the ground is held at a stable potential without the use of galvanic isolation. Heat is communicated by conduction from heat generating functionalities within the controller to its exterior. This conduction is preferably provided by a casting of a thermally conductive and electrically insulating material such as a potable epoxy. Flutes are formed in the outer surface of the casting (e.g., the outer surface of the casting corresponding to the side(s) of the controller) not in thermal communication with the heat sink to transfer heat energy to the outer environment (e.g., atmosphere, fluid medium). Such flutes also serve as connectors to exterior wires or connector pins. The controller uses a single current sensor for plural windings and preferably a single heat sensor within the controller. The controller can be networked to enhance power efficiency and the body of the controller can function as the sole plug connector.

A particularly useful application of the invention is to control one or a network of small brushless servo-motors that each powers an associated joint of a robot hand, arm, or locomotion.

The foregoing shall not be construed as limiting the scope of the present invention as other aspects and embodiments of the invention are discussed below.

DETAILED DESCRIPTION OF THE DRAWINGS

For a fuller understanding of the nature and desired objects of the present invention, reference is made to the following detailed description taken in conjunction with the accompanying drawing figures wherein like reference character denote corresponding parts throughout the several views and wherein:

FIG. 1 is a side view of a motor controller according to the present invention;

FIGS. 2A,B are various views illustrating an exemplary implementation of three motor controllers of the present invention in a robotic wrist of a robotic arm;

FIG. 5A is a block diagram schematic view illustrating a conventional home-run type of motor wiring topology;

FIG. 5B is an illustrative view of a motor embodied in the conventional home-run type of motor wiring topology of FIG. 5A;

FIG. 6A is a block diagram schematic view illustrating a conventional distributive or network type of motor wiring topology;

FIG. 6B is an illustrative view of a motor embodied in the conventional distributive type of motor wiring topology of FIG. 6A;

FIG. 7A is a block diagram schematic view illustrating a distributive or network type of motor wiring topology according to the present invention;

FIG. 7B is an illustrative view of a motor embodying a motor controller of the present invention in the distributive type of motor wiring topology of FIG. 7A;

Figure 11A:
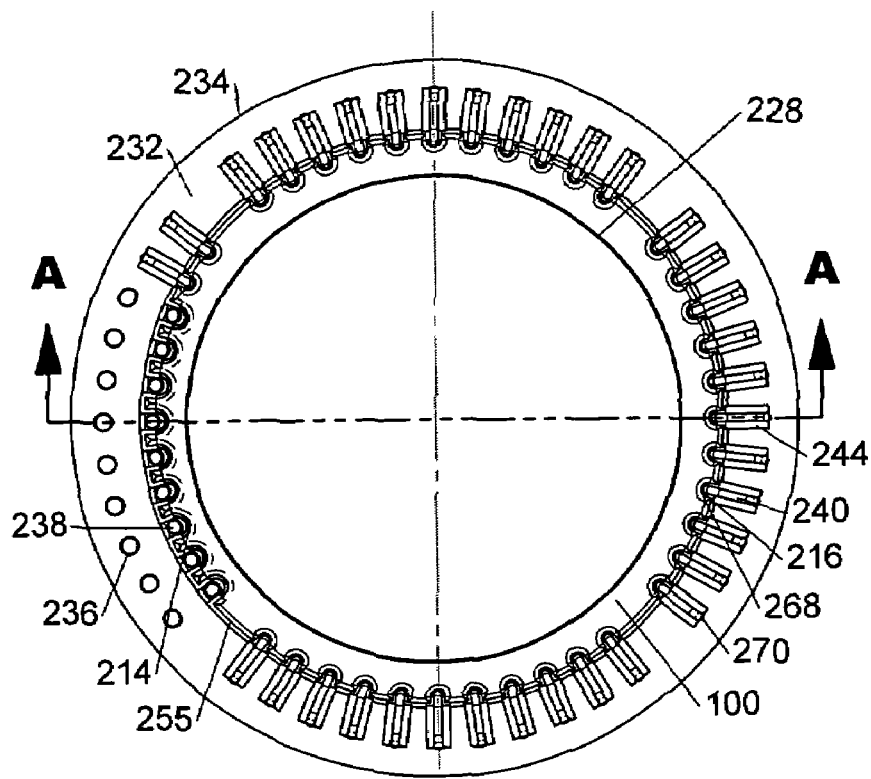
Figure 11B:
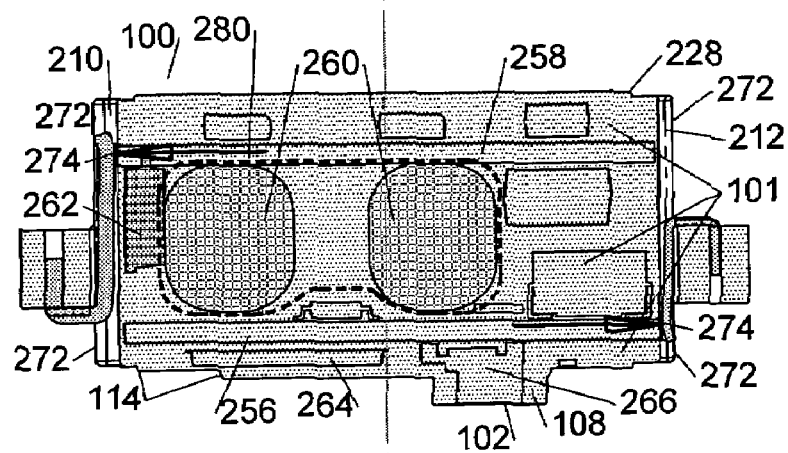
Figure 11C:
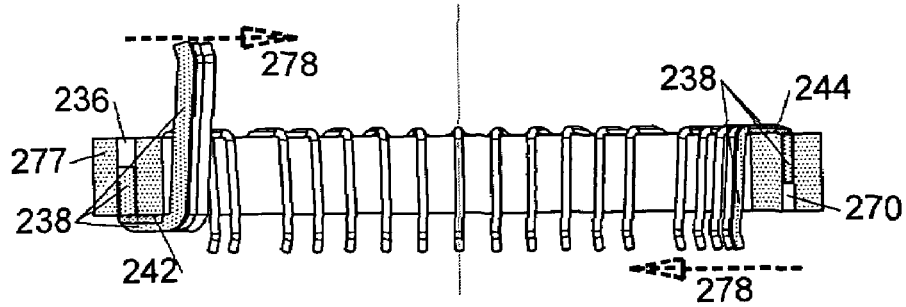
Figure 12A:
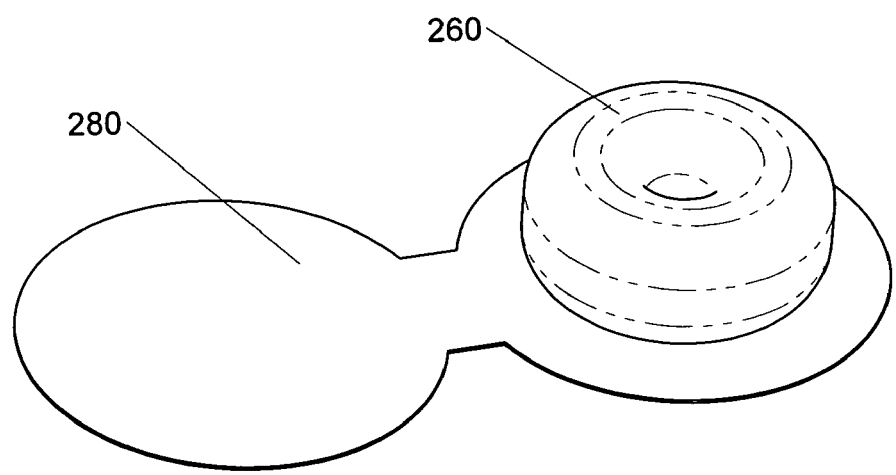
Figure 13:
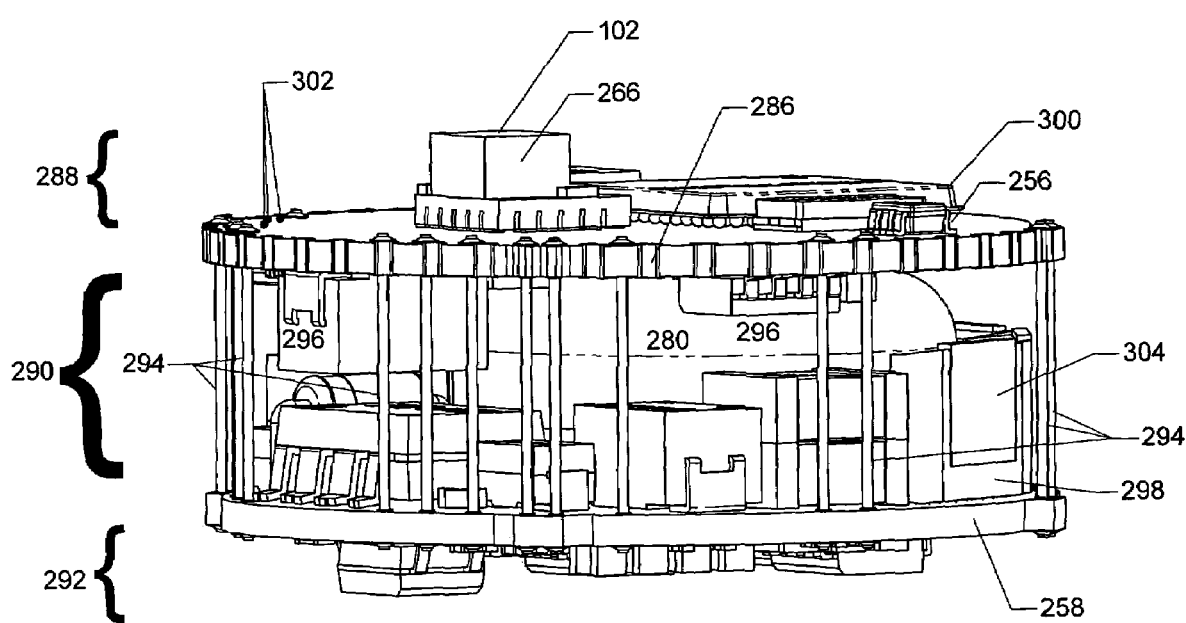
Figure 14:
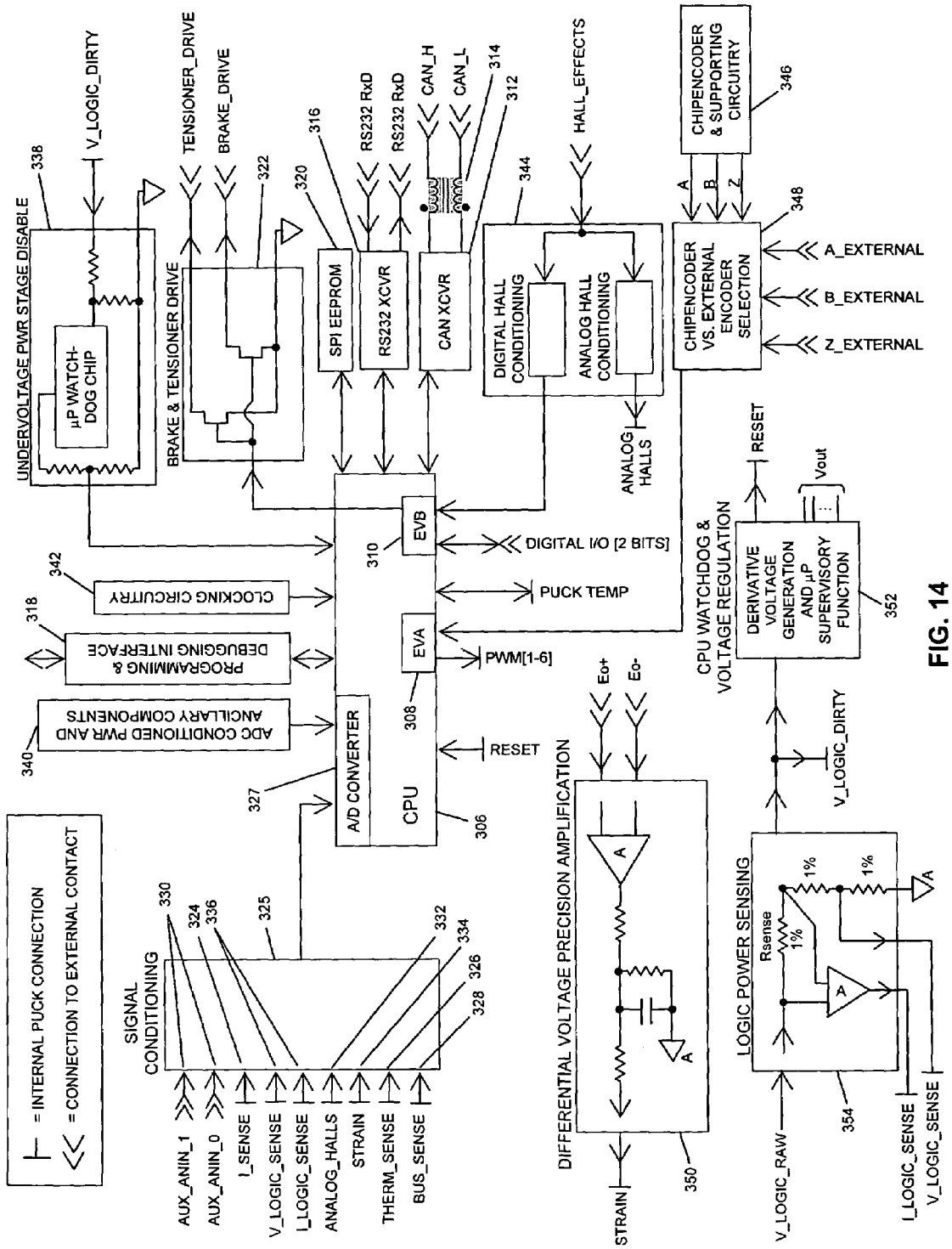
Figure 15:
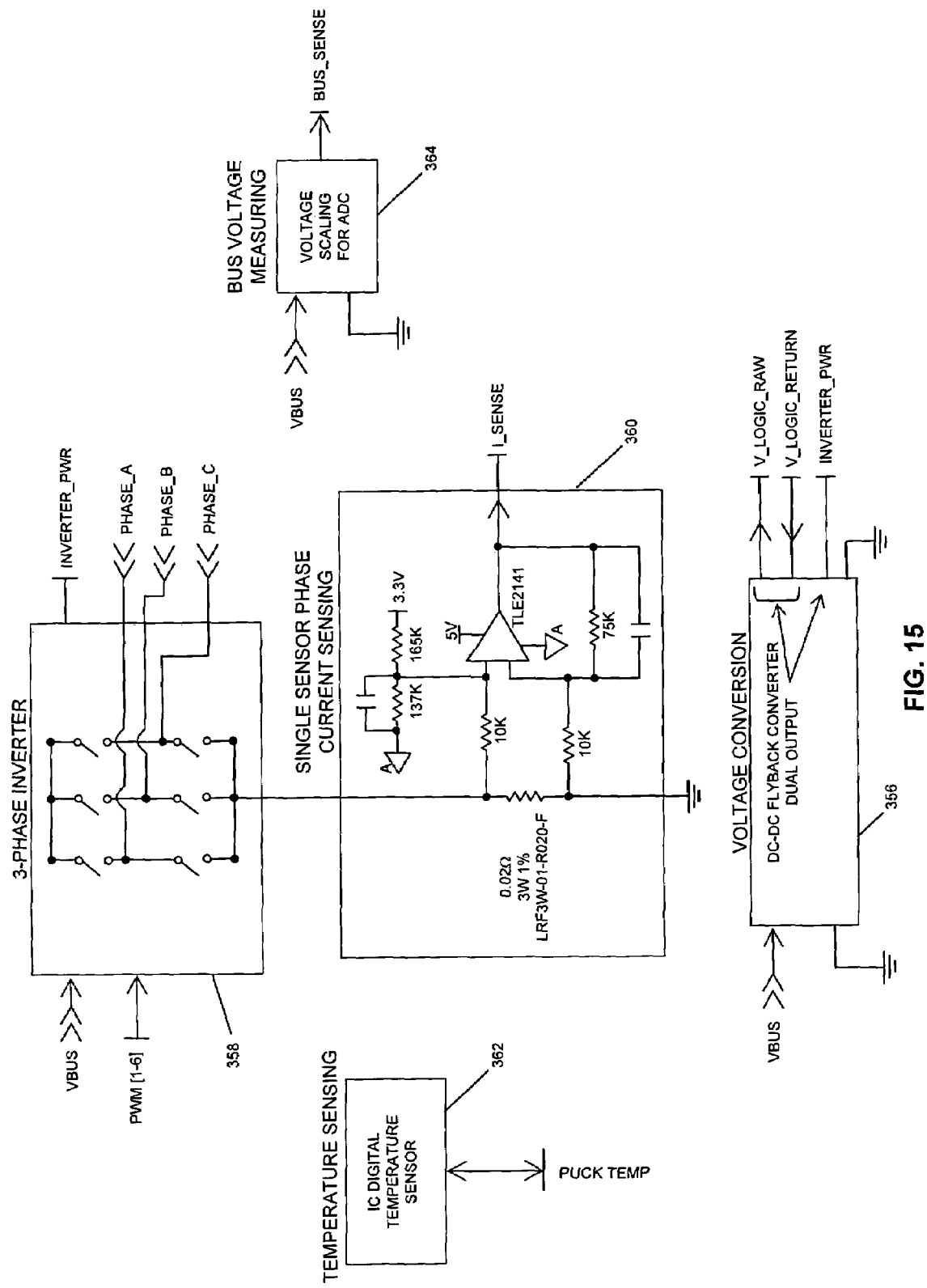
Figure 16:
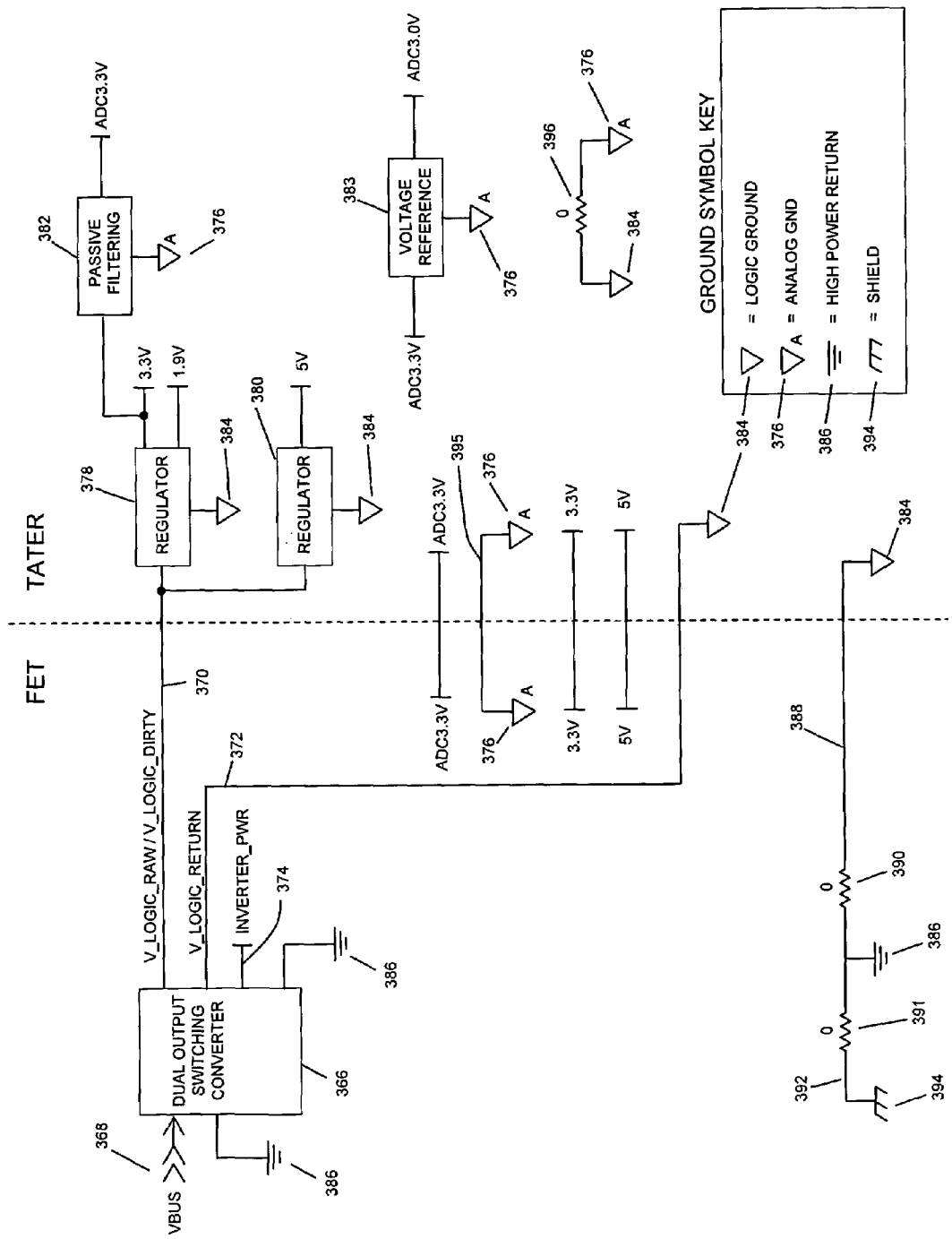
Figure 17:
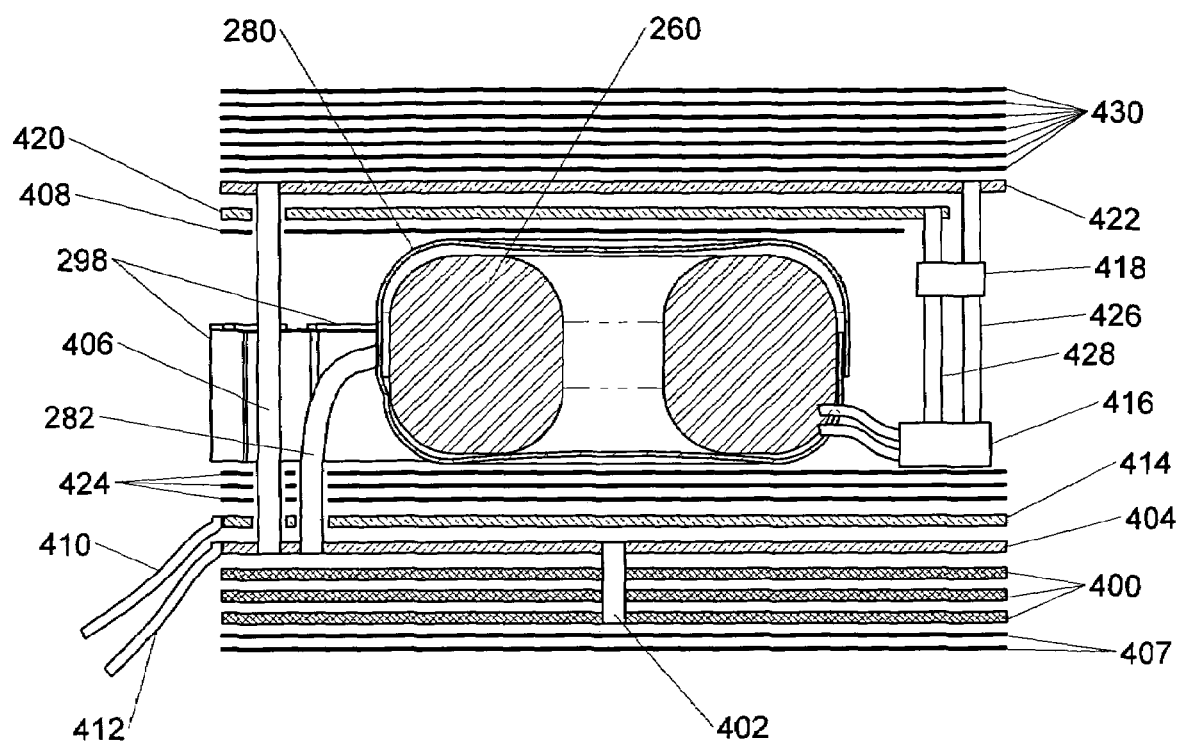
Figure 18A:
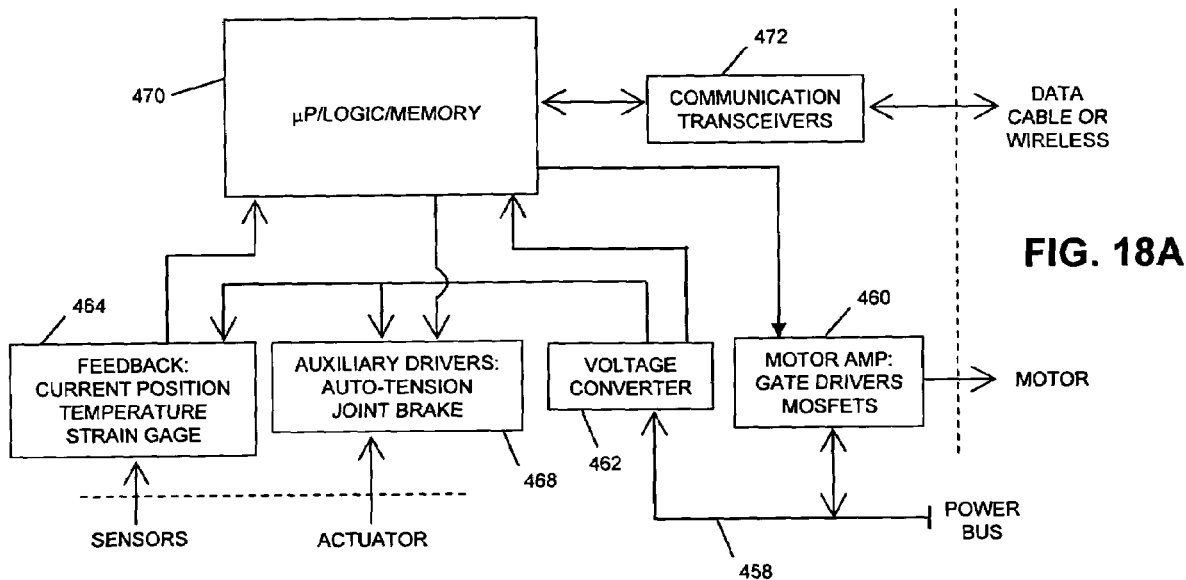
Figure 18B:
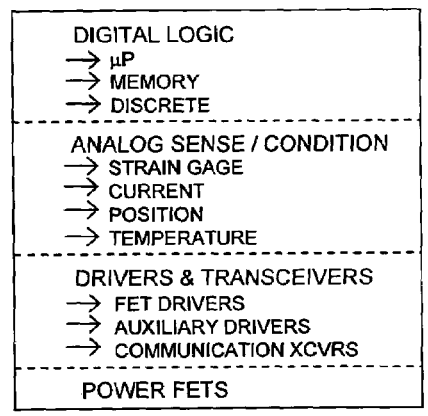
Figure 18C:
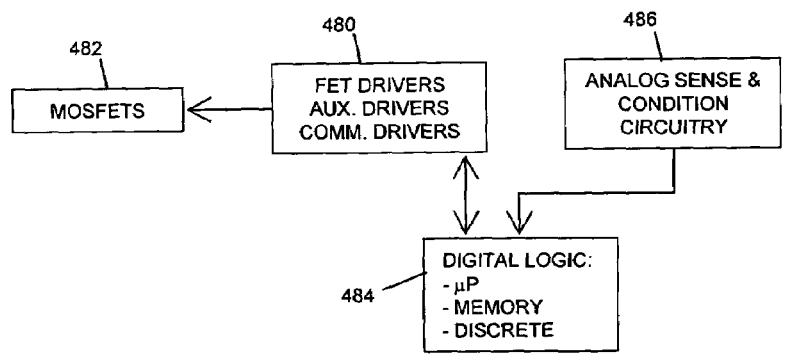

FIGS. 11A-C are various views illustrating an exemplary arrangement for electrically connecting the motor controller of the present invention to a motor system and including an EMI shield (FIG. 11B);

FIGS. 12A,B are various views illustrating an exemplary DC-DC Toroid EMI shield for a motor controller of the present invention;

FIG. 13 is an axonometric view of a motor controller of the present invention without the casting/protective epoxy to illustrate the arrangement of functionalities of the motor controller and the compactness of the controller;

FIG. 14 is an illustrative schematic block diagram view of a printed circuit board primarily for signal-level electronics of the motor controller of the present invention;

FIG. 15 is an illustrative schematic diagram view of the printed circuit board primarily for power-level electronics of the motor controller of the present invention;

FIG. 16 is a schematic view illustrating the grounding/shields for a motor controller of the present invention;

FIG. 17 is an illustrated section view showing the physical grounding and shielding scheme used inside a motor controller of the present invention; and FIGS. 18A-C are illustrative block diagrams of an alternative embodiment of the present invention in an ASIC format.

DETAILED DESCRIPTION OF THE INVENTION

There are many possible variations of geometry between the stationary and moving parts of electric motors. And the relative motion can be linear, rotary, cylindrical, spherical, or any combination comprising one, two, or many degrees of freedom. This invention is not limited by geometry or type of motions supported.

There are also many motor constructions, such as servo-motors, stepper motors, micro steppers, coreless motors, and induction motors. Some are brushed, some are brushless, some have permanent magnets, and some not. This invention applies to any motor type in which electrical current must be supported through at least one motor winding, whether or not position feedback is required.

For descriptive clarity, the disclosure of this invention uses generally accepted terminology related to a common permanent-magnet, brushless servomotor: an external set of stationery coils (stator) arranged cylindrically outside a cylindrically-shaped spinning (rotor) shaft carrying permanent magnets.

The term "motor" is used in the description of the invention, even though, in many modern applications, and as used herein, the distinction between motor and generator dissolves, with the power flow between electrical and mechanical frequently reversing.

For descriptive clarity, this disclosure uses the term "motor body" to refer only to the part of the assembly that includes the windings, magnets, shaft, frame, and bearings.

The term motor body is distinguished from the position sensor and the controller in this disclosure.

For descriptive clarity, the meaning of the word "machine" in the context of motor drives can range among automobiles, robotic arms, large industrial machines, and even small toys. While the description herein refers or illustrates use of the present invention in connection with a large industrial servo-motor driven machine, the scope of the present invention shall not be so limited.

The term "position sensor" shall be understood to mean or describe a sensor that measures or estimates position and/or any time-based derivative of position, such as velocity and/or acceleration.

The motion-control industry applies two meanings to the word "controller." In the first definition, the "controller" modulates the low-level winding voltages and power currents based on mechanical or increasingly sophisticated electronic commutation to control the position, velocity, acceleration, and/or torque of a single motor. Other terms for such a low-level motor controller include "current amplifier" and "servo-drive."

In the second definition, a high-level controller that is in communication with all motors in the system orchestrates the position, velocity, acceleration, and/or torque of the whole set of motors to achieve coordinated machine motion. The distinction blurs somewhat when a processor located on the current amplifier has both high-bandwidth communication and computation capability powerful enough to perform all of the functions of a high-level controller. Although the primary value of this invention is in its low-level capabilities, it is also simultaneously capable of coordinating a set of motors in a network to create coordinated machine motion. Furthermore, the high-level computational burden can be shared by several of the low-level current amplifiers, which scales well, since the job of the high-level controller grows with the number of axes.

Figure 1:
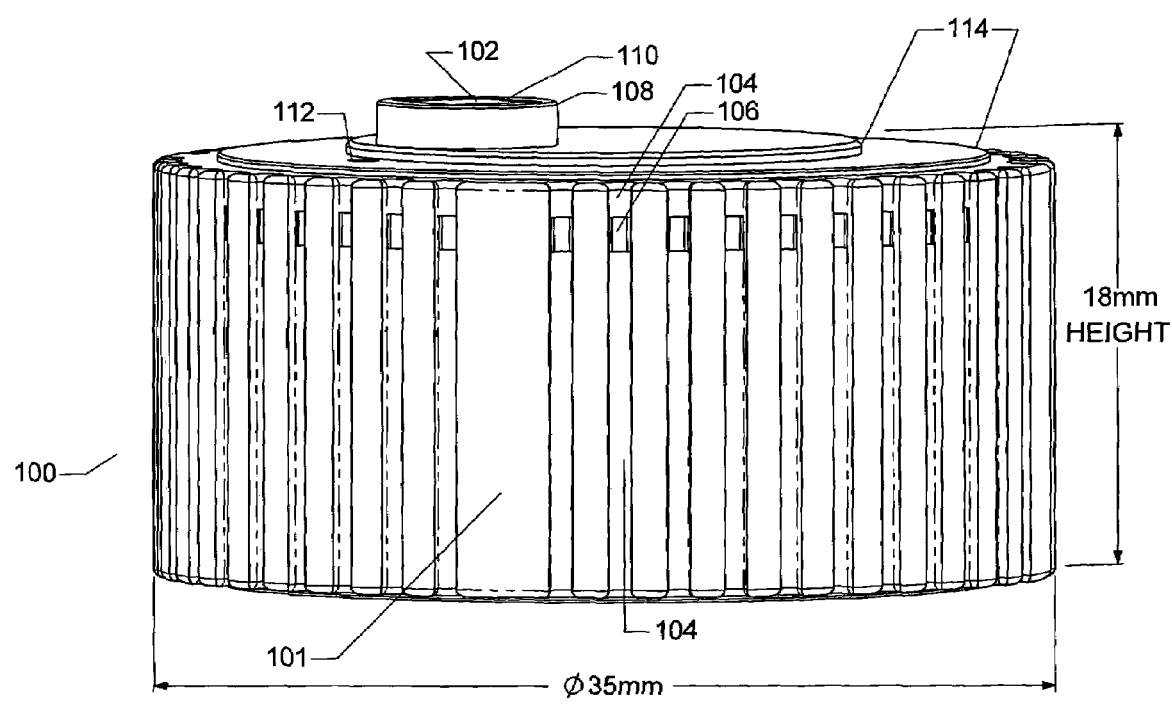

Referring now to FIGS. 1-18c there is shown an ultra-compact motor controller 100 that is suitable for robotics applications and the like according to the present invention. According to one aspect of the present invention, such as shown in FIG. 1 the ultra-compact motor controller 100 is configured and arranged so as to embody conduction cooling techniques. In particular such an ultra-compact motor controller 100 includes a high-thermal-conductivity epoxy casting 101 or, as it is also termed herein, a "matrix," or "encasement" to provide both heat conduction and electrical insulation. While complete encapsulation is described to protect the components from dust and liquids, it is contemplated and thus within the scope of the present invention, if a particular application allows, for less than a complete encapsulation to be used.

In alternative embodiments, an enclosure in combination with an electrically insulating material is used, where the enclosure is a metallic or other material with good heat conduction properties. The electrical insulator is disposed within the and in contact with the enclosure. The best practical epoxies (those without highly toxic chemical components) have less than 1% of the thermal conduction of aluminum.

In an illustrative embodiment, the casting 101 of the ultra-compact motor controller 100 is a high-thermal-conductivity epoxy ($35 \times 10^{-04}$ Cal/sec-cm-C) that maintains excellent electrical insulation ($200 \times 10^{14}$ Ohm/cm) while physically protecting the components. Except for the (protected) optical lens 102 facing the motor and electrical contacts 106, the module is substantially sealed from liquid spills and potentially-conductive or heat insulating dust.

While simple power-conversion devices are sometimes encapsulated in epoxy, higher-capacity controllers (~>100 W) are generally air-cooled because, at scales of several centimeters and larger, the heat-insulating properties of even the best epoxies become intolerable. An advantageous feature of the present invention is that at ultra-small size, characteristic heat conduction distances shrink to the point where known thermally conductive epoxies exhibit acceptable heat conduction characteristics. As such, conduction lends itself to rejecting the heat produced by heat sources within a device such as a controller via abutting, typically flat surfaces on a metal component to which the controller is mounted, typically a motor housing, that acts as a separate heat sink. As described in more detail below with respect to the illustrative exemplary embodiment, the invention also includes features such as flutes 104 formed in a side surface, to enhance the dissipation of heat conduction through the epoxy matrix to the surrounding ambient air. The controller 100 of the present invention is capable of roughly 3A RMS continuous output, and several times that at peak operation.

Stated more generally, the conventional wisdom has been to use convection air cooling for multi-watt motor controllers. To do so effectively, and to protect heat-sensitive components, the conventional wisdom has been to separate components and to avoid encapsulating or otherwise interfering with air flows that produce convection cooling at heat sources within the controller or the like. These design considerations lead to large controllers. While ultimately the ultra-compact size of the controller 100 of the present invention is determined functionally—providing the requisite degree of cooling for the needed performance—controllers according to the invention for multi-watt robotic and like applications, have a volume of less than about 20 cm$^3$.

The required capacity (and so size) of any controller is ultimately limited by the anticipated temperature of its hottest component (relative to its rated temperature). In a conventional larger-scale air-cooled controller, there are many hot spots that are thermally isolated by relatively long distances across air. Since it is often impractical to monitor all of the hot spots, and since many factors such as ambient temperature affect the degree of air cooling, controllers must generally be conservatively oversized for a particular application. The ability to monitor the hottest temperature at all times throughout the controller 100 of the present invention means that the smallest possible controller can be used more safely in a particular application.

More specifically, the relatively good heat conductivity of the ultra-small controller 100 of this invention produces and is characterized by, temperature differences within the controller that become smaller than in conventionally-sized controllers of comparable power rating. As a result, it is easier to measure the hottest temperature in the controller with fewer temperature sensors, and even only one temperature sensor. In a preferred embodiment this invention uses only one temperature sensor inside the controller (in addition to an external thermistor embedded in the motor windings).

As illustrated in FIG. 1, the electronics of the controller of the present invention are substantially enclosed in a tough, protective, gas/liquid-tight high-thermal-conductivity epoxy casting 101. The methods used for creating and applying such epoxy castings are well known in the art of epoxy-encapsulating electronic modules. The lens 102 protects the laser emitting and read optics of a high-resolution (40,960 count per revolution) optical incremental encoder with index pulse. It is surrounded by protective epoxy 108, which rises ~0.1 mm 110 above the lens surface to resist scratching while handling and during installation.

Concentric cylindrical steps 114 and perpendicular flat surfaces are used for precision mounting the module while making good thermal contact between the one face of the outer casting of the controller 100 and the motor back plate and/or other heat sink. Any surfaces not used for alignment can be textured to enhance the dissipation of the heat conducted from the interior of the controller, through the module 100, to an outer surface where convection cooling can occur. A pin hole 112 locks in the angular location of the module so that it can be removed and returned without losing calibrated position with respect to the index pulse. Although not shown, it is a simple matter to embed thread inserts on the faces of the flat epoxy surfaces. This technique of embedding thread inserts is straightforward in the art of casting electronics.

Each flute 104 can expose an electrical contact 106 from one (or both) of the boards. The contacts are formed, for example, by locating conventional plated through-holes around a diameter during the normal board-fabrication process, and then routing across the diameters of the bias to cut them in half, exposing the plated face, during the normal process of releasing the circuit boards from their panels. Counter to conventional practice (for insulated layers), however, it is necessary to anchor every via on each of the printed-circuit-board layers with a ring of copper that intersects the via face. The penetration of the anchors in the preferred embodiment is at least 0.2 mm.

Referring to FIGS. 2A,B, there is illustrated an implementation of three controller modules 100 according to the present invention in the robotic wrist, FIG. 2A, of a robotic arm and FIG. 2B illustrates the installation features. The alignment pin 116 and engagement 118 of the cylindrical alignment shoulder properly aligns the controller within a plane. Fully seating the controller face 120 with preload from a Belleville spring washer 122, adjusted by cap threads 124, ensures proper perpendicularity and standoff distance (1.75 mm) between the reflective surface of the Micro-E brand glass encoder scale 126 (which is adapted 128 to the motor shaft) and the encoder lens surface 130.

Figure 3:
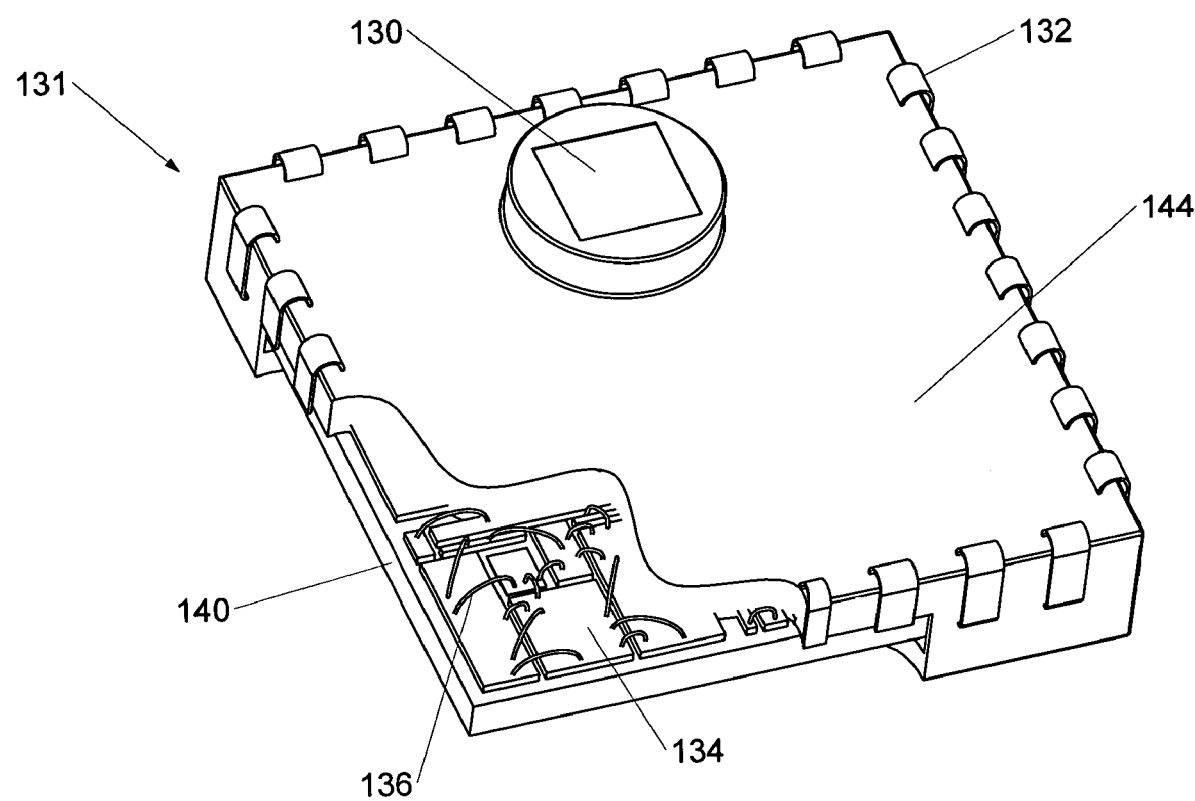
FIGS. 3-4 are top and bottom axonometric views of an alternate embodiment for the motor controller according to the present invention.
Figure 4:
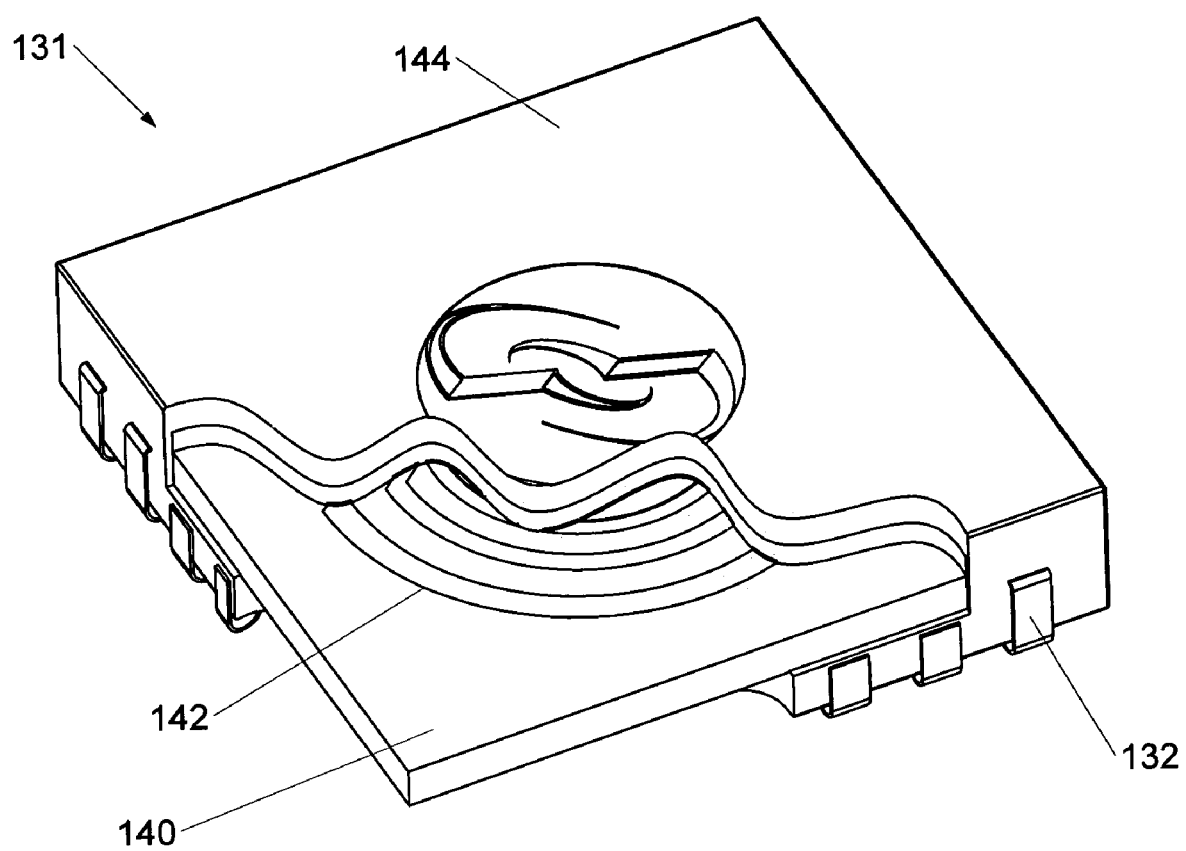

FIGS. 3, 4 present how the controller of the present invention can be applied to an alternate structure, such as a hybrid, bare-die system 131 with an integrated laser optical encoder 130 plus the following subcomponent die types 134: power MOSFETs and diodes, analog and digital ICs, mixed-signal ICs, and opto-electronic ICs. Integrating dissimilar semiconductor dies 134 onto a single substrate in this manner yields even smaller size, better heat transfer, and further reduces inter-component spacing. Single ASIC controller design would also yield a tighter geometry allowing the design innovations of this application to be optimally met.

For the bare-die example, using epoxies selected for proper CTE (coefficient of thermal expansion), the discrete and low density dies 134 could be bonded to the ceramic substrate 140. Cracking risks due to thermal cycling can be minimized by matching the CTEs of the die, epoxy, and substrate. After die attachment, the die pads 134 can be wire bonded 136 to the substrate 140. Attaching the large, power MOSFETS is a similar process, except that it's preferable to use a eutectic bonding alloy in lieu of epoxy for better heat transfer. A flip-chip mounting strategy for high density devices, such as the processor, is recommended.

The power converter transformer, normally the tallest electrical component, can be wound into the ceramic substrate with flat copper tracks 142. Ferrite material can be located above and below the wound portion of substrate to efficiently conduct magnetic flux. Beyond cooling and compactness, planar magnetics 142 offer ease of manufacture and highly predictable properties. It also is contemplated that careful shielding techniques are employed to mitigate the risk of the winding voltage transients capacitively coupling into neighboring circuits.

Power semiconductor die thermal resistance values can be well below 1° C./W. But once packaged, that value can jump to 10's or 100's of ° C./W. Without manufacturer packaging, heat can be pulled directly out of the dies into ambience. An assembly potted using a thermally conductive, highly filled epoxy resin is ideal. Less than a millimeter of epoxy between the dies and the outside package surface 144 could be achieved. Epoxy shrinkage during curing should not be an issue, as a good epoxy formulation is not expected to shrink significantly on such a small package. J-leads 132 would make it easy to provide a simple socket-pluggable package.

For machines that use several motors, known motor-wiring topologies are generally categorized as either: 1) Home-run (most installed systems today) illustrated in FIG. 5A and FIG. 5B; or 2) or network or distributive systems illustrated in FIG. 6A and FIG. 6B.

Nearly all machine systems 150 today use the home-run topology illustrated in FIG. 5A, in which each motor 152 receives its electric power from, and returns position-sensor information to, a controller cabinet 156 located off the moving structure of the machine. The controller cabinet 156 generally contains one current amplifier module 158 per motor-driven axis. For example, general-use robotic arms typically have six motor driven axes and so require six current amplifiers. In general, the cabinet also houses power-supply modules 160 that provide both motor-winding and logic voltages to the current amplifiers.

The motor 152 of FIG. 5A, which is detailed in FIG. 5B, is a typical prior art motor with at least one winding. It consists of the motor body 162 that transmits motions and torques 166 through a rotating shaft or rotor 164. Three power wires 170, 170A carrying Phase A power, 170B carrying Phase B power, and 170C carrying Phase C power, together provide the power to three motor windings (three windings is the most common case), combined in either a delta or Y-shaped topology. The referred embodiment connects the windings inside the motor body in a Y-shaped topology, because the delta winding can allow an unobservable and uncontrollable current around the delta that degrades the precision of torque control and increases torque ripple. Separate earth grounding for safety and EMI control (not shown in Figures) is achieved by any connected combination of electrically-conducting machine structure and grounding braids.

Position sensing of the angular orientation of the rotor 164 is typically in the form of three Hall-effect sensors embedded in the windings of the motor body and an optical incremental encoder 168. These devices transmit position information through signal wires 172 and 174. The motor 152 uses the following signals are used for position feedback in the general case: 172A is Hall power; 172B is Hall return; 172C is Hall 1; 172D is Hall 2; 172E is Hall 3; 174A is Encoder LED power; 174B is Encoder LED return and ground potential; 174C is A+ pulse train; 174D is A− pulse train; 174E is B+ pulse train; 174F is B− pulse train; 174G is Index+; and 174H is Index−.

When the optical incremental encoder 168 of a brushless motor is initially powered on, it can report position changes, including direction. However, until the encoder has rotated past its once-per-revolution index pulse, it does not know the absolute rotor position and cannot support electronic commutation. Until each motor has rotated far enough to identify its index pulse, the five signal wires 172A-172E support Hall-effect transducers provide crude-but-immediate six-step motor commutation information allowing each motor to be powered and rotate far enough to identify its index pulse.

Once the index pulses have been located under six-step control, the eight signal wires 174A-174H are used to transmit optical incremental encoder signals which have much higher precision than the Hall-effect sensors. Although not all optical encoders output differentially driven signals (174D, 174F, 174H), it is conventional prudent practice, given the long and electrically noisy transmission distances between the motors and the controller cabinet along where it is often impractical to separate substantially the power and signal lines. There are many other approaches and variations to measuring motor position, including brushed commutation without position feedback, estimating position based on back-EMF, absolute optical encoders, resolvers, potentiometers, and Hall-only sensors. Each has performance and reliability tradeoffs, but for high reliability and high performance, the 13 wire arrangement (172A-E and 174A-H) for position feedback is a generally accepted practice.

Some motors may have fewer than the sixteen wires (170A-174H), by using a different position-sensing scheme, or may have more than sixteen wires when, for example, motor temperature is monitored or a brake is implemented at the motor.

Typical robotic arms have six degree of freedom axes, so it is common to have 50 to 100 wires or more exiting the base of a robotic arm 154, carried through a conduit to its remote controller cabinet 156. These wires are also carried into the moving structure of the machine 150 where they must withstand high flexing and abrasion. The design of the machine must accommodate, manage, and shield these wires while having extra power to overcome their resistance to flexing.

Even though the routing of wires through a complex and constantly flexing multi-joint machine creates serious design and reliability issues, the overwhelming majority of industrial machinery relies on this scheme because it minimizes bulk in the active part of the machine while consolidating power supplies, and protecting sensitive electronics from dirt and liquids.

A network or distributive topology, e.g., the network controller illustrated in FIG. 6A, though far less common than home-run motor systems, has potential benefits which have been understood for many years. The network topology dramatically reduces the number of wires 180 carried through the machine. It relocates the bulk (volume and weight) of controllers 186 out on the machine structure, next to the associated motors 178. The increased mass must be carried by the often-moving structure. And, importantly, if the effective motor dimensions increase from the added controller bulk, the machine may need very-expensive mechanical redesign before adoption can be considered. Furthermore, a network controller is limited by the communications bandwidth of a shared serial bus.

FIG. 6B details the key components of a networked controller, in which motor body 162 and position sensor 168 are connected to a local controller 186 by power wires 190, encoder wires 188, and Hall-effect wires 189. This additional controller bulk 186 is a significant fraction of the motor+ encoder+controller bulk and may explain why network controllers have not been more widely adopted. Wires 192 exiting the networked motor 178 consist of: Bus Power+ 192A, Bus Power Return 192B, Bus Serial Communications+ 192C, and Bus Serial Communications Return 192D.

These wires are connected to the machine bus wires 180. Nominally, network controllers operate on four wires 180 (plus a ground path for safety) consisting of two bus power wires 182 and two bus serial communications wires 184. Often, more wires are used because the electronics that are now located at the motor generally need additional (logic-level) power supply voltages, for example to power optical isolators. If these additional power levels are generated locally at each motor controller, the controller bulk increases even further. The added-bulk drawback is a major reason why networked motors have remained uncommon.

If network controllers added zero bulk, they would be far more appealing to machine manufacturers, who could retrofit their existing installed base of machines. They could also rapidly adopt the technology in new machines without costly and disruptive major mechanical redesigns.

The controller 100 of the present invention can be used in a new topology described with reference to FIGS. 7A and 7B. The machine 194 of FIG. 7A contains a network of motors 196 that share the same bus 180 as typical conventionally networked motors. However, as illustrated in FIG. 7B, the encoder and Hall sensors can be integrated into the controller 200, attached directly to the motor body 162, so that the entire system occupies zero additional bulk over otherwise equivalent conventional home-run systems. The reduction of a significant bulk of wires and associated connectors, and soldered connections near the motor between FIG. 6 to FIG. 7 is substantial, and the opportunities for the injection of electrical noise over several centimeters of wire is reduced to only several millimeters of printed circuit-board traces. While motor-body size 162 tends to scale with power requirements, position sensors and sensor wiring remain relatively constant in size. The tree motor phase leads 198A-C terminate directly onto the edge of the controller, protected by channels termed herein "flutes" 104: 198A (Phase A); 198B (Phase B); 198C (Phase C). Bus wires 192A-D terminate from the other direction in four more edge flutes 104 of the controller 200. With wireless or signal-over-power bus techniques, the total number of bus wires may be reduced to only two, though the preferred embodiment uses four wires to make integration with other systems more straight forward.

According to another aspect of the, which also departs from conventional controllers, involves folding the encoder (and optionally the Hall-sensors) directly into the controller electronics. This eliminates a great deal of redundant electronics, packaging, and hook-up wiring. The reduction of wires and connectors subtracts substantial bulk and eliminates their role in behaving as EMI (electromagnetic interference) antennae. Much of the support electronics required in an encoder, except for the actual laser optics, are already available on the controller electronics. Therefore, a great deal of electronics bulk is eliminated. In the exemplary controller described below in detail, laser-optic components that support 40,960 encoder counts per motor turn occupy less than 1 $cm^3$. Also, there is no isolation required, as conductors carrying signals from the encoder to control circuitry can be, as noted above, very short and have a sufficiently large cross-sectional area that their inductance L is negligible for motor current switched at the high-frequencies normally associated with motor drives.

Wire connections are critical in a controller design of this small scale. While the multiple-amp currents remain large, the space is exceedingly small. Any conventional connector, such as a miniature-D-sub connector, would double the effective size of the module. The preferred embodiment integrates a connection scheme that adds substantially zero volume to the overall motor-plus-controller package.

Figure 8:
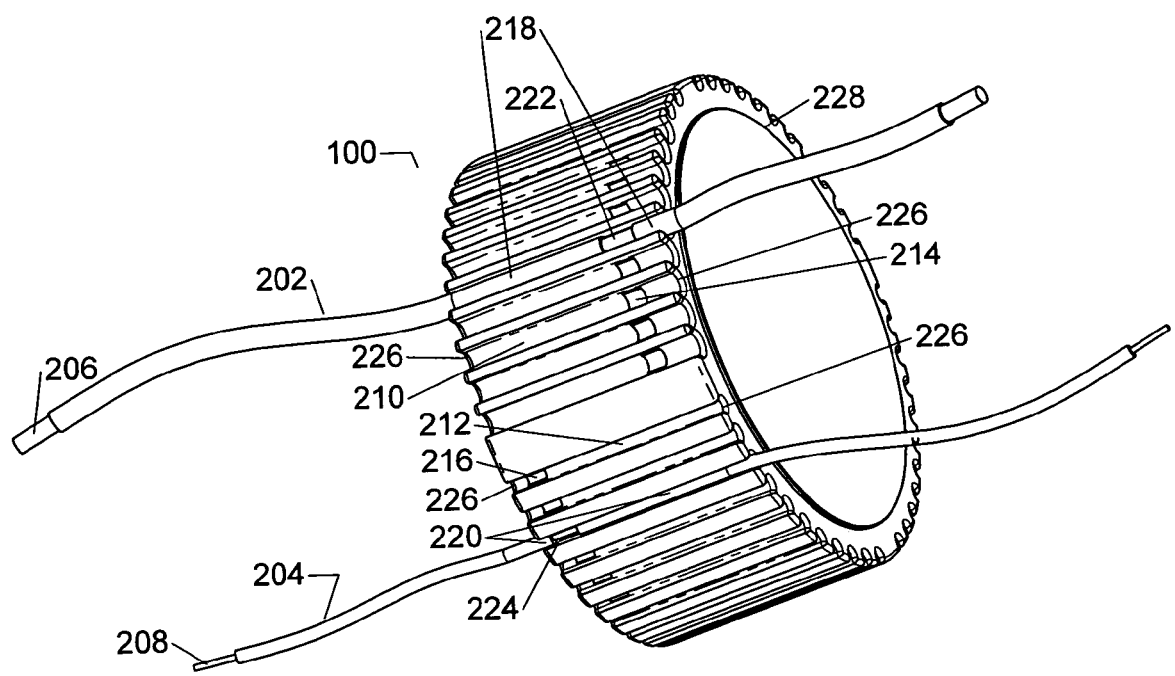
FIGS. 8 and 9 are illustrative side views of a motor controller of the present invention having soldered low-profile electrical connections.
Figure 9:
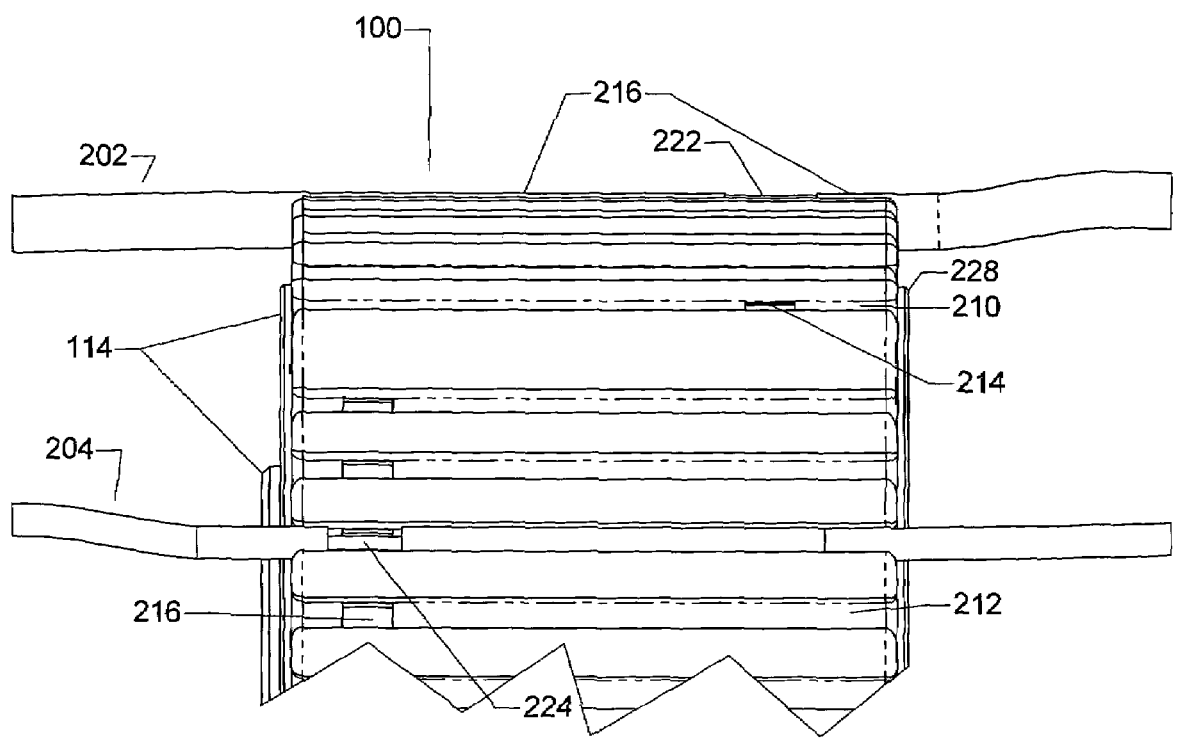

FIGS. 8 and 9 illustrate an arrangement where power 206 and signal 208 wires are permanently soldered to the module. In each case, the insulation 202, 204 is held firm in a flute 210, 212 that is sized to be just slightly less wide than the insulation diameter. The tight fit with insulation ensures good strain relief 218, 220 with the module. The ends of the flute are rounded 226 to protect insulation from abrasion as it exits the flute. Tinned conductors 214, 216 are exposed within the flute region and match the wire diameter 206, 208 for a secure solder joint 222, 224. As seen most clearly in FIG. 9, the depth of the flutes may be designed, as they are in the preferred embodiment, to extend the insulations very slightly (e.g. ~0.1 mm) above the cylindrical outer diameter of the electronics module so that a ring, tape, or tangs may be used to further clamp the insulations in place to maximize robust strain relief. FIGS. 8 and 9 also show an auxiliary cylindrical alignment feature 114, 228 that can accommodate alternate mounting strategies.

Figure 10:
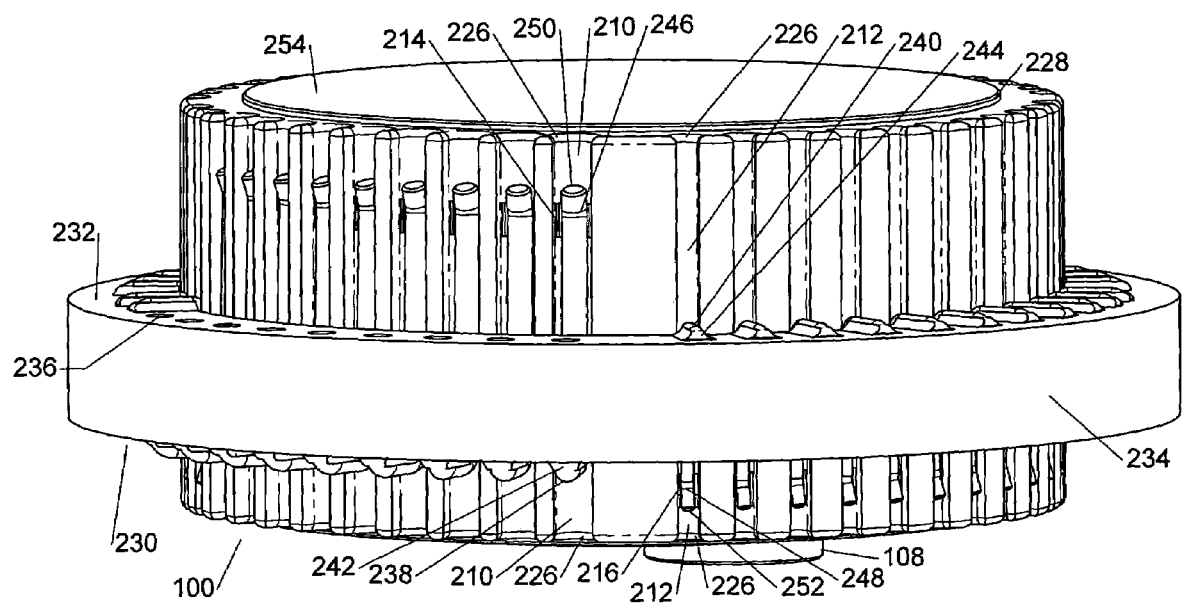
FIG. 10 is another illustrative side views of a motor controller of the present invention having spring-loaded low-profile electrical connections.

FIGS. 10 and 11 illustrate one of many possibilities for treating the entire controller module as a single, multi-conductor connector through the use of flexible contacts. Even in cases where the module will ultimately be permanently soldered in place, such a connector feature facilitates efficient quality checking of modules before and after being cast in epoxy to form the casting 101.

Variations can be used for installations of the controller 100 into particular machines. The controller module 100 fits into connector 230 which consists of a printed-circuit board host ring 232, the outer edge 234 of which can be extended outwardly in any shape to support any quality-checking electronic hardware or connection headers. Plated through holes 236 in the printed circuit board host accommodate flexible power 238 and signal 240 beryllium-copper pins, anchored by solder 242, 244. A bend 246, 248 in the pins combined with chamfered ends 250, 252 enable the pins to slide smoothly in the flute and up on top of the electrical contacts. Thread inserts on the epoxy face 254, combined with the alignment shoulder 228 or the opposite features on the other (hidden in this view) side of the controller can help to hold the module firmly aligned. Alternately the entire module may be clamped against the alignment shoulder on the opposite face. In FIG. 11A, the 35-mm controller outer diameter 255 is centered within the connector ring, allowing some clearance in the flute 268 for the associated anchored pins 270. The cross-section of the connection in FIG. 11B exposes the epoxy matrix 276 from which the flutes are formed. Pins are guided by the flute sidewalls 272 upon installation. When in final position, spring pressure maintains a reliable electrical contact 274. The cross-section of the ring 277 in FIG. 11C illustrates the spring motion resulting from removal of the controller.

Figure 12B:
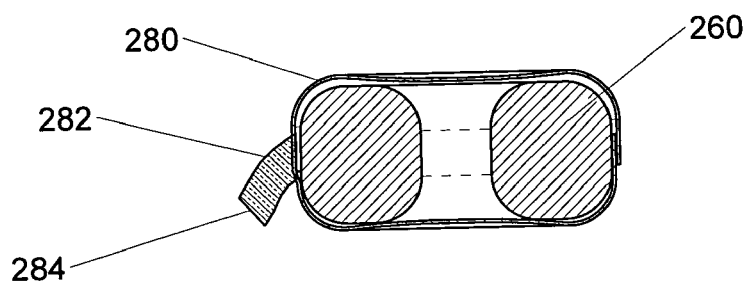

A toroidal transformer 260 in FIG. 12, the largest single component in the controller, is nested just inside the semicircle of MOSFETs. The transformer is at the heart of the ability to convert the single motor bus voltage from 18-100 vdc into multiple logic Vcc voltages. Since the toroid is a major EMI emitter, it is shielded separately in its own clamshell-like insulated solid-copper-foil shield 280 that is varnish insulated and grounded at a single point 284.

FIG. 13 illustrates that inside the surrounding, protective epoxy module 100, the controller has top 256 and bottom 258 ten-layer, generally mutually parallel spaced, printed-circuit boards that segregate the volume of the motor controller substantially into three layered regions, a signal-level, a somewhat quiet top region 288 (normally facing the associated motor back); a tall, noisy, sandwiched region 290; and a quiet bottom region 292 (facing away from the motor). Large power-supply capacitors 296 associated with the transformer are stacked in order to optimize utilization of the available vertical sandwiched space 290. To help contain the EMI to the sandwiched region, one or more of the board layers closest to the sandwiched region contain copper ground shields 280. In one form, the shields are conventional metallic shielding that is embedded in the P.C. boards 256, 258, and selectively activated by an electrical connection. Other known shielding can be used. In particular, circuits and discrete circuit components that are particularly noisy can be specially shielded.

Though it could be any shape, the preferred shape for the boards 256 and 258 is essentially circular and flat to fit within the form factor of most conventional optical incremental encoders, and to minimize the maximum distance of the farthest component from centroid of the controller 100. This compactness consideration is significant not only because of the EMI, inductance, and heat considerations noted above, but also because in encapsulating the circuit elements in epoxy, as the epoxy cures, it shrinks. As it shrinks or otherwise degrades, it can pull components on a board and shear them away, or degrade the electrical connection. The compactness of the present invention resists this effect.

Note that alternate embodiments of this invention could take many other forms, including, but not limited to: a single board containing both circuits 256 and 258, or circuits 256 and 258 on two separate boards connected by flexible Mylar interconnect.

In the exemplary design of FIG. 13, six power MOSFETs 298 are placed side-by-side, standing upright in a semicircle just inside of the outer edge of the board with their heat sinks 304 facing outwards to optimize heat transfer to the surrounding epoxy matrix 276 for conduction and elimination from the controller. Of course, while six MOSFETs is ideal for the preferred application described herein, a d.c. brushless motor of a robotic device, those skilled in the art will recognize that a different number may be more appropriate in other cases.

Board-to-board electrical connections 294 are implemented in the illustrated embodiment shown in FIG. 13 by eighteen stiff, "vertical" (axially oriented) solid-wire conductors located along the periphery of the boards for assembly accessibility. The boards are fixtured during soldering so that the wires space the boards, e.g. at 9.5 mm.

The top region 288 is dominated by a CPU (central processing unit) 300. Optionally, there is space for integral Hall-sensor motor-position sensing 302. A Micro-E brand optical-incremental-encoder read-head 266 is integrated directly onto the top board, offset from the board center in this illustrative embodiment by 6 mm so that the read-head is aligned with an optical radius from a conventional reflective optical wheel mounted on the end of the rotating motor shaft. The combination yields 40,960 A-B counts per revolution of the motor shaft plus one index pulse. At this level of precision, the controller can be used for metrology applications as well as commutation. The incremental cost for adding position sensing, even at this level of precision, is currently only US$50, which is competitive with stand-alone encoders of much lower precision. The optics have built-in correction for misalignment. Testing has validated that the controller modules work reliably when simply installed without further alignment.

A small proximity sensor (not shown) can be placed on the centerline of the module 100 to measure distance between the controller module and the end of the associated motor shaft. In the robotics application described in the aforementioned U.S. published application No. US-2004-0103740-A1 for "Intelligent, Self-Contained Robotic Hand", when the motor shaft drives a worm gear, torque on the worm-wheel axially deflects the slight, inherent motor-shaft compliance away or toward the module. Calibrating output torque versus proximity reading allows DSP (digital signal processor). 300 to calculate worm-wheel torque, which can then be built into a control algorithm, for example, to protect the fingers of a robot hand by actively limiting maximum torque.

These boards are termed herein as "Tater" and "FET," respectively. Description of the Tater board in FIG. 14 begins with the implementation of a central processing unit (CPU) 300 in FIG. 13. FIG. 15 then maps out the functions of the FET board 258 in FIG. 13. FIG. 16 discloses the ground and power distribution scheme. FIG. 17 further illustrates grounding and shielding, and FIG. 12 shows the shielding technique of the toroidal transformer, 260 in FIG. 11B.

Tater board design of this exemplary embodiment is centered on a high-temperature, BGA (ball-grid array) version of the Texas Instruments TMS320F2812, a 32-bit DSP 306 in FIG. 13. Tater runs the DSP 306 at an 80 MHz clock rate, within the 150 MHz rating of the DSP. The BGA package size of this DSP is also very small, measuring only 10×10×1 mm=0.1 cm$^3$.

In FIG. 14, DSP 306 contains two event managers, EVA 308 and EVB 310, each of which is capable of providing the specialized space-vector commutation pulses that are essential to commutate and control a motor. There is no reason why one cannot control two motors with the basic design as disclosed here, except for a small size penalty. However, the illustrated embodiment uses only EVA to control one motor to keep controller size within the package size of most encoders of similar performance to the encoder feature of this controller. Some EVB ports have been reassigned as GPIO (general-purpose input/output).

The serial bus communications 312 uses a tiny common-mode choke 314 to filter electrical noise in place of the more-commonly used opto-isolation technique. The serial communications follows the CANbus protocol, which is supported natively in the DSP 306. An RS232 serial transceiver 316 and programming and debugging interface 318 enable auxiliary communications for use in programming, development and debugging. CANbus and the RS232 serial communications are routed to available electrical contacts in the flutes, even though a customer will normally need only the two CANbus contacts. The programming, development and debugging contacts are only available before the epoxy is cast as they are not routed to outside flute contacts.

A 256 Kbit serial EEPROM 320 complements the RAM and Flash memory that are available onboard the DSP. Duty-cycle current modulation from unregulated 6 vdc is available from two 50 mA auxiliary power sources 322 that can actuate an auto-tensioner (as implemented on the preferred embodiment WAM robotic arm) and/or a robotic braking device exploits the available EVB 204 pins that support pulse-width modulation. For each of these power sources the pulse-width modulation controls the duty cycle of a MOSFET. When applied to other products, these power sources become available for other purposes.

The single current sensor feedback 324 is a measure of the current on a single wire or at a single connection point in each of the three phases in very fast sequence during space-vector commutation. As discussed above, measuring in this way overcomes a performance problem with normal two- and three-sensor current amplifiers in that it is very difficult to match perfectly the slightly different gains and biases of the different sensors. Not matching these sensors well is a common and significant source of torque ripple. A conventional thermistor that is embedded in the motor windings is fed back to the Tater at 326. Bus voltage sensing is fed back at 328. Auxiliary analog signal sensing is fed back at 330. Hall-sensor 332 and strain-gage signals 334 are also fed to the controller. The analog signals can be low-pass filtered and clamped for overvoltage or noise suppression in the signal conditioning block 325 before being fed into the CPU's analog to digital converter 327.

Logic voltage and current are fed back at 336. A "watchdog" circuit 338 monitors the unregulated 6 vdc logic voltage and disables the inverter if voltage droops too low. A DC power conditioning circuit 340 implements a filter. Finally, the DSP clock is implemented in circuit 342.

The Hall-effect feedback conditioning circuit 344 allows for different "stuffing options" depending on the type of Halls to be implemented. The MicroE encoder read-head circuit 346 and a selection circuit for choosing between the onboard encoder or an external encoder is in the chip encoder 348 and the differential voltage circuit 350 shows the strain-gage signal-conditioning schematic with stuffing options for filter tuning. Differential voltage generation circuit 352 shows regulation of the dirty (unregulated) logic-voltage, which are initiated in fixed sequence per CPU manufacturer specifications, accompanied by CPU "watchdog circuitry". Logic-power sensing circuitry is shown in circuit 354.

The FET-board schematic is shown in FIG. 15. It consists of a DC-DC converter circuit 356 that uses a transformer with two secondary windings to produce two lower, unregulated voltages from the main power bus: a voltage for the MOSFET drivers and a voltage that is delivered to the Tater board for further refinement to regulated logic voltages.

The motor drive 358 consists of six MOSFETs (although a different number might be used depending on the type of motor) to modulate the winding currents based on current feedback from the current sensing and conditioning circuit 360. The single temperature-sensing chip for the entire controller is represented by 362. Bus voltage is measured by circuit 364.

According to yet another aspect of the present invention, and contrary to conventional design practice, is the use of one winding-current sensor, such as sensor 324 in FIG. 14, preferably applied to all of the windings in fast sequence. One sensor is smaller, and wastes less power, than the two or more sensors conventionally used to sense and control winding currents. Space-vector control, used in the preferred embodiment for robotics applications, is a high-torque-precision electronic commutation technique that provides very high precision control of winding currents (and therefore motor torque), while boosting power efficiency over common six-step commutation. But space-vector control requires precise current measurements.

A major and unexpected benefit of using only one current sensor is that, while it provides less direct measurement than two sensors, it actually improves the precision of current-control. A central challenge in current sensing with multiple sensors is that each sensor has a slightly different bias and gain which drift slightly differently with temperature. The differences between any pair of sensors leads to current-sensor errors, a major source of added torque ripple. By using only one sensor the sensor bias and gain remain identical under all conditions. A single sensor in the controller of the present invention makes torque ripple (which occurs at the frequency of the number of poles per revolution) not detectable when this controller was used to drive a WAM-brand robotic arm system sold by Barrett Technology Inc. of Cambridge, Mass., hereinafter "the WAM arm." Slight motor cogging, which is generated by the magnets passing close to the islands of iron separating T-slots in the iron core still exists at the frequency of the number of T-slots in the iron core per revolution, but this disturbance torque is easy to cancel, e.g. by using a calibration look-up table. The table can be stored permanently on the controller's EEPROM and accessed in real time allowing the table to be applied at any frequency, independent of the serial-bus bandwidth.

FIG. 16 illustrates how grounding is done in the controller, and how derivative voltage levels are created and distributed. The flyback converter 356, fed by the main bus voltage 368 and high power return 386, creates two output voltages: V_LOGIC_RAW 370 to V_LOGIC_RETURN 372 (hereinafter referred to as simply V_LOGIC_RAW), which is a floating output, and INVERTER_PWR 374 which is referenced to high power return 386.

V_LOGIC_RAW feeds power to the voltage regulators on the Tater board 286 on FIG. 13: the 3.3V/1.9V regulator 378 on FIG. 16, and the 5V regulator 380. The regulated 3.3V is filtered via the CPU manufacturer's recommendation for the analog to digital converter 327 (FIG. 14) in passive filtering 382 in FIG. 16. The filtered voltage is referenced to an analog ground 376 established on Tater 286 (FIG. 13). The filtered voltage is then fed into a voltage reference 383 (FIG. 16) to create 3.0V for an analog signal sensing voltage reference.

Return currents are sent to voltage converter 366 via V_LOGIC_RETURN 372. However, the logic ground 384 is tied to high power return 386, at a single point 390, via an electrically quiet, thick, non-current carrying path 388. The shielding layers 400 in FIG. 17 in the FET board (258 in FIG. 13) are also tied to high power return 386 in FIG. 16 through a single point 391, and thick connection 392. Shield ground is represented by 394.

As well as being used on the Tater board 286 (FIG. 13), 5V, 3.3V, and ADC3.3V are passed to FET 258. Their return currents are conducted back to Tater through conductor 395 on FIG. 16, and back to logic ground via a single point connection 396.

Power and communications bussing are done in a network topology. Since there is only one power bus, ground looping between multiple power busses is not an issue. There is also only one network communication bus. The CAN bus is protected from spikes of common mode noise and ground currents through a common mode choke 314 FIG. 14 inline with the CAN connection in the controller.

FIG. 17 shows the physical shielding and grounding scheme inside the controller. The copper routing layers 408 carry sensitive signals. These layers are shielded from the noisier routing layers 424, by shielding layers 400. Shield layers 400 are tied together at a single point 402, and tied to the high power return layer 282 at that same point 402. The single point connection 402 eliminates current loops within the layers. The positive bus node plane 414 is connected to the bus wire 410. Bus power return 282 is connected at location 412. Bus power return sets the common point for the entire controller, and thus is given a thick 1 oz. copper plane so that it conducts high, switched currents with minimal resistive and/or inductive effects. The high power return layer 282 is tied to logic ground 422 via a single point connection 406, or as alternately seen at non-current carrying path 388 in FIG. 16.

Power can be seen going from the DC-DC converter 416 on FIG. 17 on the FET board 258 in FIG. 13 to the Tater board 286 via 426 in FIG. 17 and low inductance conductors 428. The regulator shown at 418 establishes 3.3V between planes 420 and 422.

Due to the electrically noisy nature of the components between the FET 258 and Tater 286 boards in FIG. 13, there is only one Tater 286 routing layer 408 in FIG. 17 between the power and ground planes 420 and 422 and the center cavity. All other Tater 286 in FIG. 13 routing layers 430 in FIG. 17 benefit from the shielding properties of the plane layers 420 and 422.

One of the primary EMI noise emitter in the controller is the toroidal transformer 260. Therefore it is wrapped in a copper foil shield 280, which then gets tied to high power return through the high power return layer 282. The shielding blocks harmful EMI from leaving the toroid and infecting sensitive circuitry, which could cause undesired controller operation.

Another noise emitter are the MOSFETs 298 which are carefully placed around the edge of the controller away from the more sensitive circuitry located toward the center. The MOSFETs are populated with their metal drain-connected tabs facing radially outward, so that during voltage switching transients the tabs don't spray electrostatic noise into controller circuitry.

The controller 100 in FIG. 1 can be organized in functional blocks. The single power bus provides power to 1) the motor amplifier, gate drivers and MOSFETs as shown at block 460 in FIG. 18A, and 2) a voltage converter 462 that in turn powers the feedback block 464, auxiliary drivers block 468, the microprocessor, logic and memory block 470, and a communication transceiver block 472 that acts as an I/O interface to external data, whether via wires, wireless, or communication over power line modes. The feedback block receives signals output by sensors such as conventional Hall sensors, encoders, temperature sensors, and strain gauge sensors, all described herein, and otherwise known. The auxiliary drivers block powers actuators that control, for example, tension in cable drives, if used, and joint brakes, if used. The block can, for example, utilize two MOSFETs that turn on and off a power source that in turn operates an actuator such as a solenoid. The MOSFETs can operate at high frequencies such as 10 Khz. The motor amplifier, gate driver and MOSFET functional block generates conventional motor drive outputs for a DC brushless motor, or the like.

As a further size reduction alternative, beyond the alternate embodiment illustrated in FIG. 3 and FIG. 4, the functional blocks shown in FIG. 18A could be consolidated into functionally similar application specific integrated circuits (ASICs) and grouped closely together on a substrate, as shown logically in FIG. 18C. The functional chip groupings of the embodiment that makes sense are: FET driver, autotensioner driver, communication line drivers 480; current sensing and amplification/conditioning, strain gage amp, temperature sensing, and position sensing 486; power MOSFETs 482; and DSP, memory and discrete logic 484.

To achieve the voltage conversion function, presently done by 356 in FIG. 15 it is further contemplated that smaller profile voltage conversion options include: charge pump; different shape transformers (built into the connectors to the puck controller); use of an AC bus with step-down transformer and rectifier (commutation becomes more difficult but this disadvantage may be offset by other considerations); transformer and other big power conversion circuitry built into motor phase windings; or use of planar magnetic 142 techniques to wind the transformer into the substrate material.

A second further size reduction implements the motor controller circuitry of the puck controller 100 in FIG. 1 as one ASIC chip utilizing Very Large Scale Integration (VLSI) on a single silicon chip as shown in FIG. 18B. Both the VLSI chip embodiments, FIG. 18C and FIG. 18B produce a much smaller profile than the puck controllers 100 utilizing discrete-components on PCB's.

The ready presence and combination of a powerful processor with plenty of volatile and nonvolatile memory at the motor, a wealth of local sensing information, and a knowledge of the state of all motors via the shared communications bus, enables many important functions to be calculated locally, simultaneously improving performance, reducing burden on the serial bus, and reducing the computation and memory of processors outside the network system. The invention as implemented in the illustrated embodiment(s) exploits this unique capability in several ways. Residual motor-cogging is mapped into a look-up table stored on the EEPROM. Then the local controller modifies the last torque command, being received at 500 Hz or every 2 msec, as the encoder senses position changes. With such a high-resolution encoder, the number of pulses that will be received within the 2 msec CANbus delay is significant.

Consequently performance is improved by the ability to calculate and filter state variables such as velocity and acceleration faster than the communications bandwidth. Even at low velocities, logging the precise time that encoder pulses are received dramatically improves velocity estimation and filtering, which normally suffer from gross discretation errors. Several control calculations that depend on precise, real-time state information can then react and change the motor's controlled output without waiting for the next 2-msec update. For example, in haptics, the timely estimation of velocity and acceleration directly impact the user's haptic perceptions of damping and inertia. The ability to poll sensors and recalculate an array of other important values quickly compared to the bus frequency can also be applied to gravity compensation and gravity-vector estimation with the on-board accelerometer.

A shared knowledge by each motor controller of the state of all the motors in the system at 500 Hz also allows parallel processing of higher-level kinematic matrix calculations. An example is the calculation of the Jacobian matrix, whose coefficients are functions of all motor positions. This calculation need not be accomplished as fast as 500 Hz, because it changes only gradually with position changes, but the computational burden, which would normally require a higher-level processor outside the network system, is no longer required.

Although a preferred embodiment of the invention has been described using specific terms, such description is for illustrative purposes only, and it is to be understood that changes and variations may be made without departing from the spirit or scope of the following claims.

Incorporation by Reference

All patents, published patent applications and other references disclosed herein are hereby expressly incorporated by reference in their entireties by reference.

Equivalents

Those skilled in the art will recognize, or be able to ascertain using no more than routine experimentation, many equivalents of the specific embodiments of the invention described herein. Such equivalents are intended to be encompassed by the following claims.

What is claimed is:

1. A controller for a motor having an output element and a winding, comprising:
    a power circuit that controls current in the winding of the motor,
    a signal circuit that controls the power circuit;
    an electrical ground common to said power and said signal circuits, and
    electrical connectors among said ground and said power and said signal circuits, said power and signal circuits, ground, and electrical connectors being ultra-compact to produce substantially the same potential throughout said ground during the operation of the controller,
    said controller compactness being characterized by a transmitted power density of about at least 20 watts per cubic centimeter.

2. The controller of claim 1 wherein said electrical connectors are characterized by a very low inductance.

3. The controller of claim 1 wherein said connectors include a common mode choke.

4. The controller of claim 1, further comprising a sensor that observes current in the power circuit, wherein said electrical connectors also connect said sensor to said circuit.

5. The controller of either of claims 1 and 4 wherein said electrical connectors provide continuous electrical connection with no isolators.

6. The controller of claim 1 wherein said ground is a plane of a conductive material with a very low inductance.

7. The controller of claim 1, further comprising shielding that manages EMI.

8. The controller of claim 1 further comprising a thermally conductive, electrically insulating casting that at least in part encases said controller to provide a conductive thermal path to communicate heat generated within said controller to its exterior surface.

9. The controller of claim 8 wherein the casting is arranged so that a heat conductive path from any point within the controller to the exterior surface of the controller is less than a predetermined value such that the internal heat transfer for heat dissipation is principally conductive and sufficient to produce a substantially isothermal temperature gradient within the controller.

10. The controller of claim 9, further comprising a temperature sensor, where said sensor includes a single temperature sensor located within the controller.

11. The controller of claim 8 wherein material comprising said casting is an epoxy.

12. The controller of any of claims 8-11 where said casting encapsulates said controller so as to block fluid flow into the controller.

13. The controller of claim 8 wherein said casting is in thermally conducting direct contact with hot spot components of said power and signal circuits.

14. The controller of any of claims 9-11 wherein the predetermined value for said casting is one of about 1-3 cm, or less or about 2 cm or less, and a thermal conductivity of the casting is in excess of about 1 W/m-° K.

15. The controller of claim 8 further comprising a heat sink exterior to said casting and in a heat-transmissive relationship with it.

16. The controller of claim 15 wherein said heat sink is a housing of said motor.

17. The controller of claim 15 wherein said casting has flutes on an exterior surface not in contact with said heat sink to facilitate the transfer of heat from said casting to the surrounding environment.

18. The controller of claim 17 wherein said flutes are structured to hold a conductor exterior to the controller.

19. The controller of claim 18 wherein said flutes contain an electrical contact to one of said electrical connectors of the controller adapted to make electrical connection with said conductor received in said flute.

20. The controller either of claim 8 wherein said power circuit includes a PC board, plural power transistors mounted on said PC board at its periphery, and a DC to DC transformer that is disposed centrally with respect to said plural power transistors.

21. The controller of claim 20 wherein said power transistors are FET's having heat-conducting backs facing outwardly and in a conductive heat-transferring relationship with said casing.

22. The controller of claim 1, further comprising a sensor that observes current in the power circuit, wherein the winding is plural windings and said sensor includes a single current sensor that provides a measurement of the currents flowing in said plural windings.

23. The controller of claim 22 wherein said single current sensor comprises a high speed operational amplifier connected across a high precision resistor.

24. The controller of claim 22 wherein said electrical connectors connect one lead of said resistor to said ground.

25. The controller of either of claims 1 or 8, further comprising a position sensor, wherein the active read head of said position sensor comprises an encoder that detects the position of the output of the motor and is co-located on and integral with the controller.

26. The controller of claim 25 wherein said electrical connectors connect said encoder with said signal circuit to provide said positional information.

27. The controller of claim 26 wherein said encoder connectors have a length of less than about 10 mm.

28. The controller of claims 26 or 27, wherein said encoder is an optical encoder.

29. The controller of claim 25 wherein said encoder is enclosed within said controller and contributes no additional volume to its bulk.

30. The controller of claim 1 further comprising electrical conductors exterior to the controller and at least one additional one of said controllers, said second electrical conductors forming a network of said controllers and their associated motors.

31. The controller of claim 29 wherein said second electrical conductors interconnect said signal circuits of each of said controllers to coordinate the energization of the motor windings of the motors and to control the distribution of electrical power among said networked motors and controllers.

32. The controller of claim 30 wherein said motors, when acted on by an external force, function as generators of electrical power that can be distributed throughout said network.

* * * * *